United States Patent
Ghemawat et al.

(10) Patent No.: US 7,222,119 B1
(45) Date of Patent: May 22, 2007

(54) NAMESPACE LOCKING SCHEME

(75) Inventors: Sanjay Ghemawat, Mountain View, CA (US); Howard Gobioff, San Francisco, CA (US); Shun-Tak Leung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 10/608,135

(22) Filed: Jun. 30, 2003

Related U.S. Application Data

(60) Provisional application No. 60/447,277, filed on Feb. 14, 2003, provisional application No. 60/459,648, filed on Apr. 3, 2003.

(51) Int. Cl.
*G06F 17/30* (2006.01)
(52) U.S. Cl. .................. 707/9; 711/152; 711/161; 711/162; 713/156; 713/175
(58) Field of Classification Search .............. 707/1–10; 711/152, 161; 713/156, 175
See application file for complete search history.

(56) References Cited

U.S. PATENT DOCUMENTS

| | | | | |
|---|---|---|---|---|
| 4,709,326 A | * | 11/1987 | Robinson ................. | 710/200 |
| 5,287,521 A | * | 2/1994 | Nitta et al. ............... | 710/200 |
| 5,689,706 A | * | 11/1997 | Rao et al. ................. | 707/201 |
| 5,897,638 A | * | 4/1999 | Lasser et al. ............. | 707/102 |
| 5,933,825 A | * | 8/1999 | McClaughry et al. ...... | 707/8 |
| 7,062,490 B2 | * | 6/2006 | Adya et al. ............... | 707/10 |
| 2005/0102268 A1 | * | 5/2005 | Adya et al. ............... | 707/1 |

OTHER PUBLICATIONS

U.S. Appl. No. 10/608,139, filed Jun. 30, 2003; Ghemawat et al.; entitled: "Systems and Methods for Replicating Data"; 62 pages.
U.S. Appl. No. 10/608,039, filed Jun. 30, 2003; Ghemawat et al.; entitled: "Garbage Collecting Systems and Methods"; 59 pages.
U.S. Appl. No. 10/608,307, filed Jun. 30, 2003; Ghemawat et al.; entitled: "Systems and Methods for Maintaining Data in a File System"; 58 pages.
U.S. Appl. No. 10/608,136, filed Jun. 30, 2003; Ghemawat et al.; entitled: "Leasing Scheme for Data-Modifying Operations"; 60 pages.
Thomas Anderson et al., "Serverless Network File Systems", Proceedings of the 15th ACM Symposium on Operating System Principles, Copper Mountain Resort, Colorado, Dec. 1995, pp. 1-21.

(Continued)

*Primary Examiner*—Alford Kindred
*Assistant Examiner*—Hanh Thai
(74) *Attorney, Agent, or Firm*—Harrity Snyder, LLP

(57) ABSTRACT

A system may perform a first operation within a file system in which directories and files are organized as nodes in a namespace tree. The system may associate a read-write lock with each of the nodes in the namespace tree. The system may acquire a first lock on a name of one or more directories involved in the first operation, acquire a second lock on an entire pathname involved in the first operation, determine whether the first lock or the second lock conflicts with third locks acquired by a second operation, and perform the first operation when the first lock or the second lock does not conflict with the third locks. The first, second, and third locks may include read-write locks.

15 Claims, 15 Drawing Sheets

OTHER PUBLICATIONS

Remzi H. Arpaci-Dusseau et al., "Cluster I/O with River: Making the Fast Case Common", Proceedings of the Sixth Workshop on Input/Output in Parallel and Distributed Systems (IOPADS '99), Altanta, Georgia, May 1999, pp. 1-13.

Garth A. Gibson et al., "A Cost-Effective, High Bandwidth Storage Architecture", Proceedings of the 8th Architectural Support for Programming Languages and Operating Systems, San Jose, California, Oct. 1998, pp. 1-12.

Barbara Liskov et al., "Replication in the Harp File System", 13th Symposium on Operating System Principles, Pacific Grove, California, Oct. 1991, pp. 226-238.

David A. Patterson et al., "A Case for Redundant Arrays of Inexpensive Disks (RAID)", Proceedings of the 1988 ACM SIGMOD International Conference on Management of Data, Chicago, Illinois, Sep. 1988, pp. 109-116.

Frank Schmuck et al., "GPFS: A Shared-Disk File System for Large Computing Clusters", Proceedings in the First USENIX Conference on File and Storage Technologies, Monterey, California, Jan. 2002, pp. 231-244.

Chandramohan A. Thekkath et al., "Frangipani: A Scalable Distributed File System", Proceedings of the 16th ACM Symposium on Operating System Principles, Saint-Malo, France, Oct. 1997, pp. 224-237.

InterMezzo, http://www.inter-mezzo.org, 2003.

Luis-Felipe Cabrera et al., "Swift: Using Distributed Disk Striping to Provide High I/O Data Rates", Computer Systems; 1991; pp. 1-24.

John H. Howard et al., "Scale and Performance in a Distributed File System", ACM Transactions on Computer Systems, vol. 6, No. 1, Feb. 1988; pp. 51-81.

U.S. Appl. No. 10/608,140, filed Jun. 30, 2003; Ghemawat et al.; entitled: "Systems and Methods for Performing Record Append Operations"; 64 pages.

* cited by examiner

NAMESPACE LOCKING SCHEME

REFERENCE TO RELATED APPLICATIONS

This application claims priority under 35 U.S.C. §119 based on U.S. Provisional Application No. 60/447,277, filed Feb. 14, 2003, and U.S. Provisional Application No. 60/459,648, filed Apr. 3, 2003, the disclosures of which are incorporated herein by reference.

BACKGROUND OF THE INVENTION

1. Field of the Invention

The present invention relates generally to data storage and, more particularly, to systems and methods for storing data in a fault-tolerant and distributed manner.

2. Description of Related Art

In existing file systems, large collections of data are usually organized as files on disks. When the number of files becomes large, the files may be distributed over multiple file servers. Clients access the files by requesting file services from one or more of the file servers.

Existing file systems are limited in many respects. For example, the file systems do not scale well. As the number of files grows, it becomes necessary to add new file servers and redistribute the current distribution of the files. This can be a time-consuming process, which sometimes requires human operator intervention. Also, the file systems do not handle failures well. Oftentimes, file servers or disks fail or data becomes corrupt. This may cause certain files to become unavailable.

Accordingly, there is a need for a distributed file system that delivers good scalable aggregate performance and continued operation in the event of failures.

SUMMARY OF THE INVENTION

Systems and methods consistent with the principles of the invention address this and other needs by providing a scalable distributed file system that may deliver high aggregate performance to a possibly large number or clients despite the occurrence of possibly frequent failures.

In accordance with an aspect of the invention, a method for performing a first operation within a file system in which directories and files are organized as nodes in a namespace tree is provided. The method may include associating a read-write lock with each of the nodes in the namespace tree. The method may also include acquiring a first lock on a name of one or more directories involved in the first operation, acquiring a second lock on an entire pathname involved in the first operation, determining whether the first lock or the second lock conflicts with third locks acquired by a second operation, and performing the first operation when the first lock or the second lock does not conflict with the third locks, where the first, second, and third locks are read-write locks.

In accordance with another aspect, a method for performing first and second operations within a file system is provided. The method may include acquiring one or more first locks on one or more first directory names involved in the first operation, acquiring one or more second locks on one or more second directory names involved in the second operation, acquiring a third lock on a first pathname involved in the first operation, and acquiring a fourth lock on a second pathname involved in the second operation. The method may also include determining whether the first and third locks conflict with the second and fourth locks and concurrently performing the first and second operations when the first and third locks do not conflict with the second and fourth locks. The one or more first locks, the one or more second locks, the third lock, and the fourth lock may include read-write locks.

In accordance with yet another aspect, a method for concurrently performing first and second operations within a same directory is provided. The method may include obtaining a first lock on a sub-directory or file name within the directory by the first operation and obtaining a second lock on a sub-directory or file name within the directory by the second operation. The method may also include determining whether the first and second locks conflict and concurrently performing the first and second operations when the first and second locks do not conflict. The first and second locks may include read-write locks.

In accordance with a further aspect, a file system that includes a memory and a processor is provided. The memory may store information regarding directories and files as nodes in a namespace tree. The processor may associate a read-write lock with each of the nodes in the namespace tree and identify a set of the nodes involved in an operation, where the identified nodes form a pathname associated with the operation. The processor may further acquire a first one or more read-write locks, as one or more first locks, on the identified nodes and acquire a second one of the read-write locks, as a second lock, on the pathname. The processor may also determine whether the one or more first locks or the second lock conflict with any other read-write locks and permit the operation to execute when the one or more first locks and the second lock do not conflict with the other read-write locks.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may use a locking scheme over regions of the namespace to permit operations to proceed in parallel without interfering with each other. Each operation acquires a set of locks on portions of the namespace and is permitted to proceed when these locks do not conflict with locks acquired by other operations.

Exemplary Network Configuration

Figure 1:
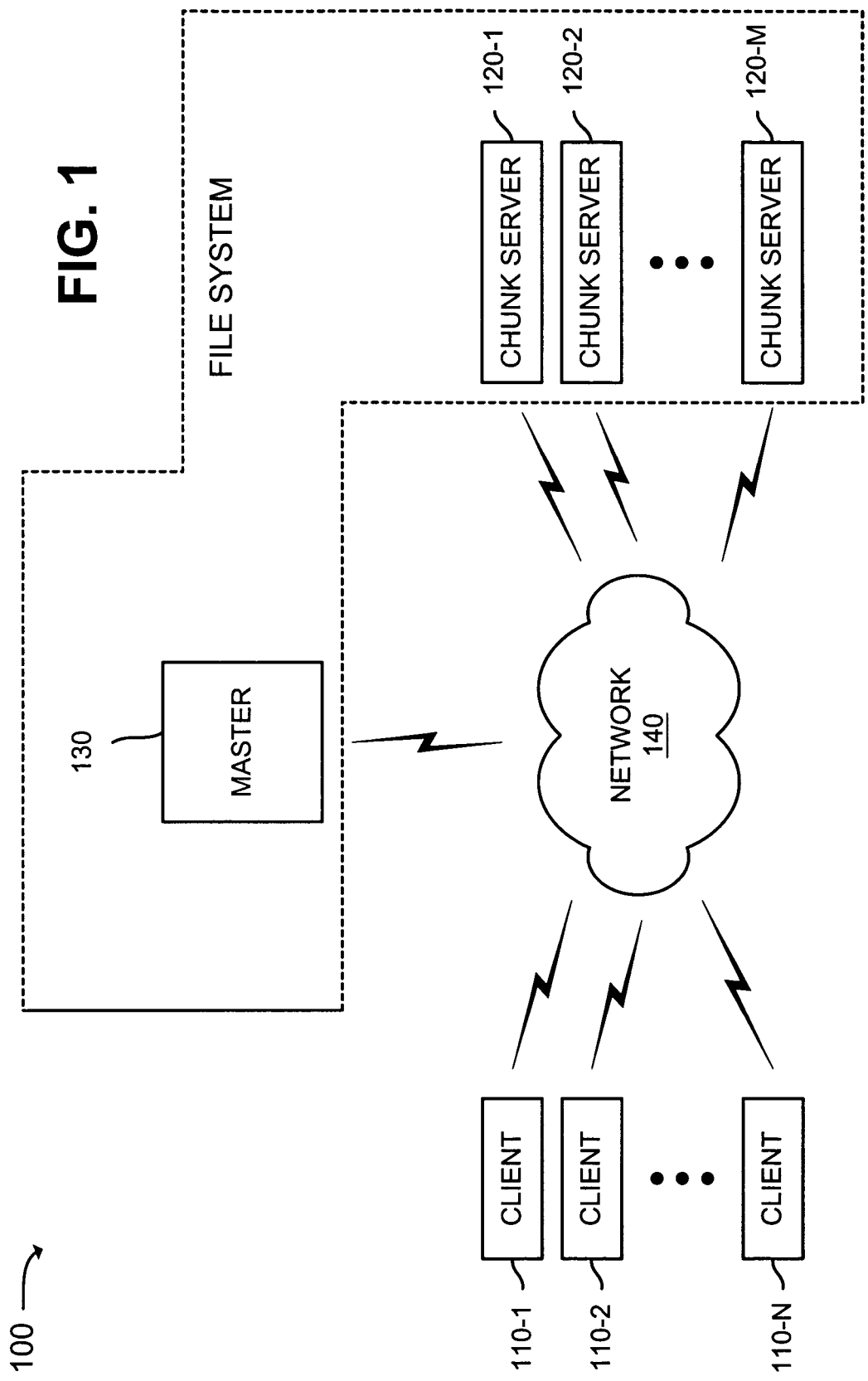
FIG. 1 is a diagram of an exemplary network in which systems and methods consistent with the principles of the invention may be implemented.

FIG. 1 is an exemplary diagram of a network 100 in which systems and methods consistent with the present invention may be implemented. Network 100 may include clients 110-1 through 110-N (collectively referred to as clients 110), chunk servers 120-1 through 120-M (collectively referred to as chunk servers 120), and a master 130 connected via a network 140. Chunk servers 120 and master 130 may form a file system (as shown by the dotted line in FIG. 1).

Network 140 may include one or more networks, such as a local area network (LAN), a wide area network (WAN), a telephone network, such as the Public Switched Telephone Network (PSTN), an intranet, the Internet, a similar or dissimilar network, or a combination of networks. Clients 110, chunk servers 120, and master 130 may connect to network 140 via wired, wireless, and/or optical connections.

Clients 110 may include one or more types of devices, such as a personal computer, a wireless telephone, a personal digital assistant (PDA), a lap top, or another type of communication device, a thread or process running on one of these devices, and/or objects executable by these devices. In one implementation, a client 110 includes, or is linked to, an application on whose behalf client 110 communicates with master 130 and chunk servers 120 to read or modify (e.g., write) file data. In some instances, a client 110 may perform some or all of the functions of a chunk server 120 and a chunk server 120 may perform some or all of the functions of a client 110.

Chunk servers 120 may include one or more types of server devices, threads, and/or objects that operate upon, search, maintain, and/or manage data in a manner consistent with the principles of the invention. Chunk servers 120 may store data as files divided into fixed-size chunks. In one implementation, the size of a chunk is 64 MB. Each chunk may be identified by an immutable and globally unique 64-bit chunk handle assigned by master 130 at the time of chunk creation. Chunk servers 120 may store chunks in local memory and read or write chunk data specified by a chunk handle and byte range. For reliability, each chunk may be replicated on multiple chunk servers 120. The number of replicas may be user-configurable. In one implementation, there may be three replicas of each chunk.

Master 130 may include one or more types of devices, such as a personal computer, a wireless telephone, a PDA, a lap top, or another type of communication device, a thread or process running on one of these devices, and/or objects executable by these devices. Master 130 may control storage of chunks by chunk servers 120 and access to the chunks by clients 110. Master 130 may maintain namespace data, access control information, mappings from files to chunks, and the current locations of chunks. Master 130 may also control system-wide activities, such as chunk lease management, garbage collection of orphaned chunks (i.e., chunks not accessible by other chunks), and chunk migration between chunk servers 120. Master 130 may periodically communicate with each chunk server 120 using heartbeat messages to give it instructions and collect its state information. To provide fault tolerance, master 130 may be replicated one or more times.

Exemplary Chunk Server Configuration

Figure 2:
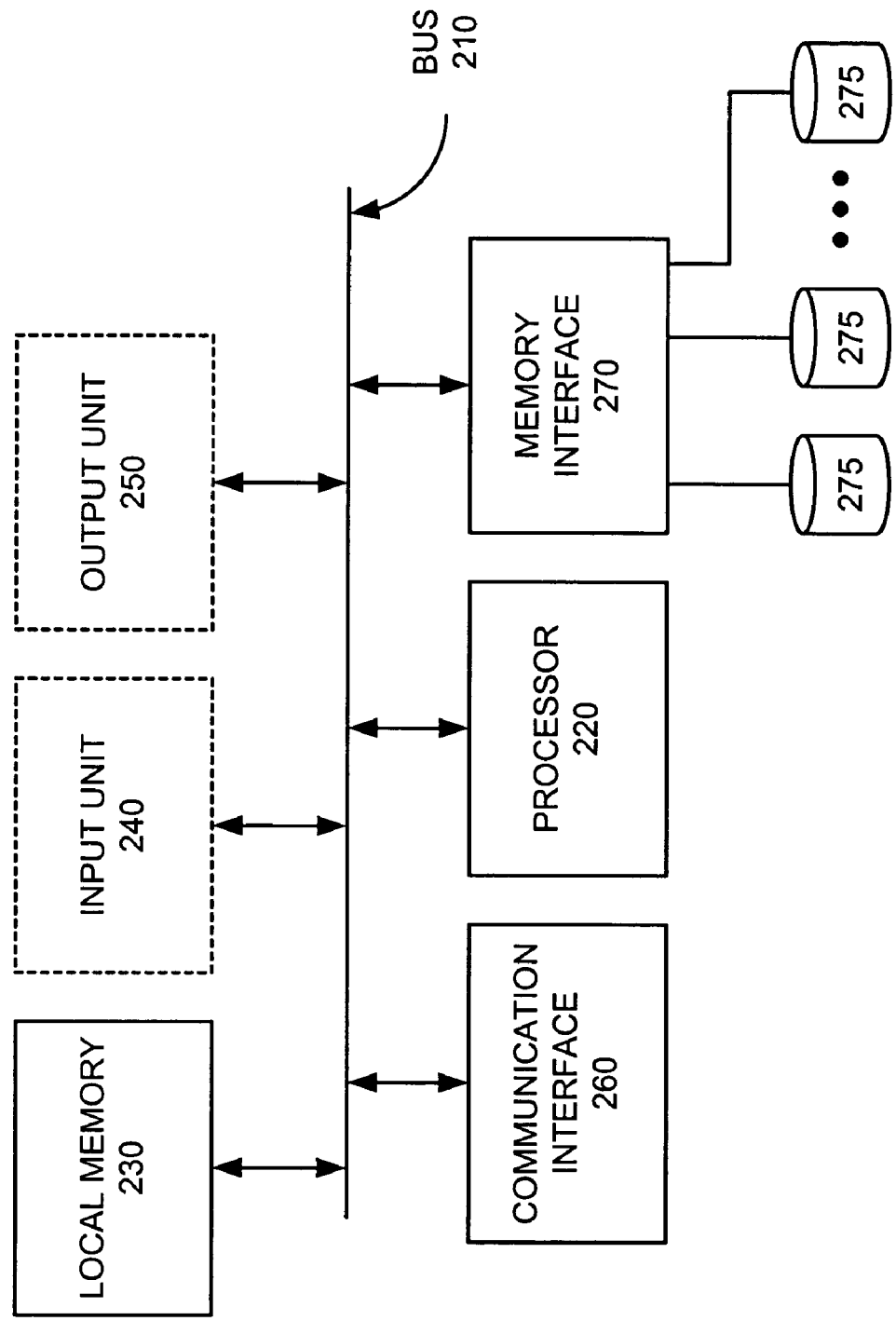
FIG. 2 is an exemplary diagram of a chunk server of FIG. 1 in an implementation consistent with the principles of the invention.

FIG. 2 is an exemplary diagram of a chunk server 120 in an implementation consistent with the principles of the invention. Chunk server 120 may include a bus 210, a processor 220, a local memory 230, one or more optional input units 240, one or more optional output units 250, a communication interface 260, and a memory interface 270. Bus 210 may include one or more conductors that permit communication among the components of chunk server 120.

Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 220.

Input unit 240 may include one or more conventional mechanisms that permit an operator to input information to chunk server 120, such as a keyboard, a mouse, a pen, voice recognition and/or biometric mechanisms, etc. Output unit 250 may include one or more conventional mechanisms that output information to the operator, such as a display, a printer, a speaker, etc. Communication interface 260 may include any transceiver-like mechanism that enables chunk server 120 to communicate with other devices and/or systems. For example, communication interface 260 may include mechanisms for communicating with master 130 and clients 110.

Memory interface 270 may include a memory controller. Memory interface 270 may connect to one or more memory devices, such as one or more local disks 275, and control the reading and writing of chunk data to/from local disks 275. Memory interface 270 may access chunk data using a chunk handle and a byte range within that chunk.

Exemplary Master Configuration

Figure 3:
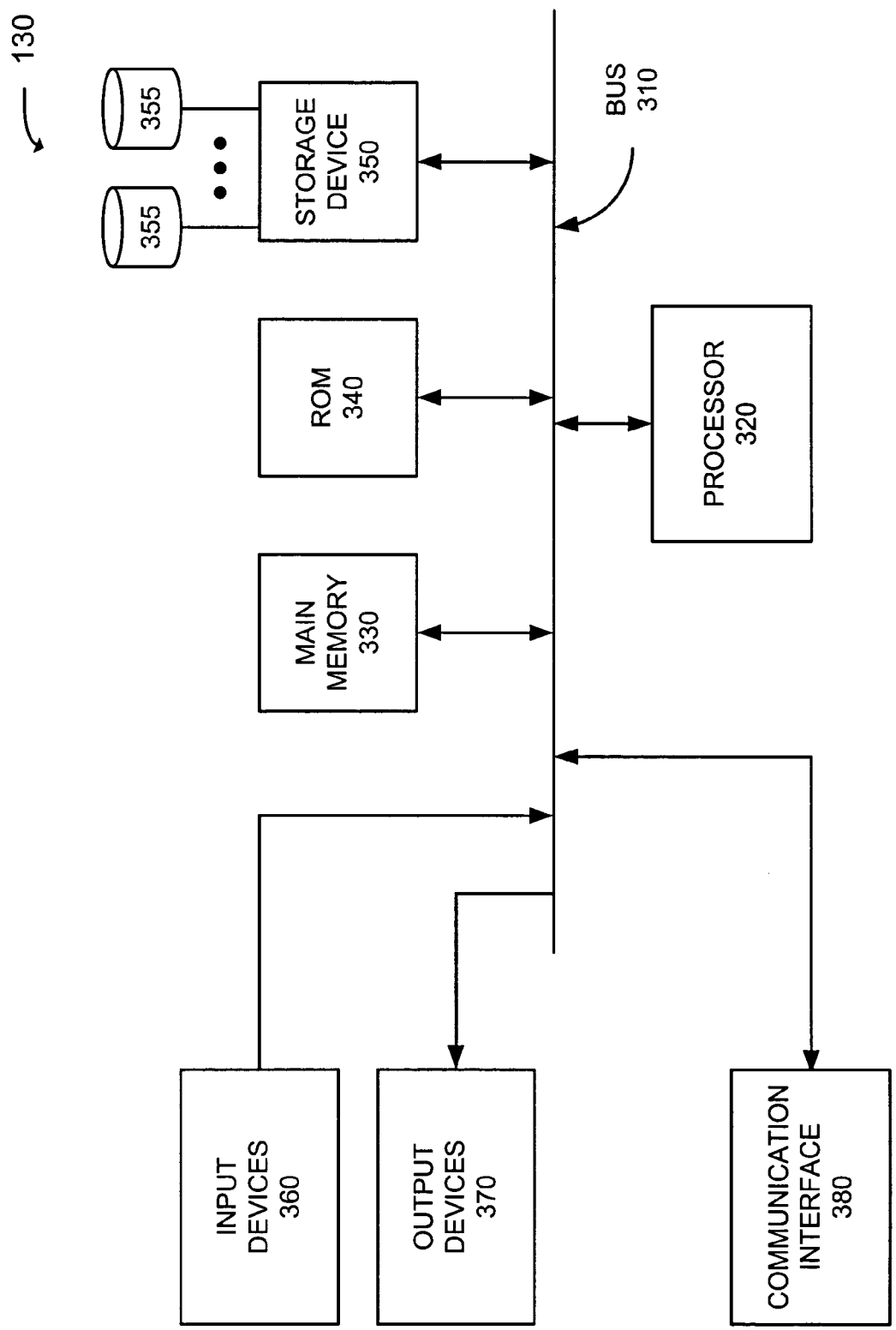
FIG. 3 is an exemplary diagram of the master of FIG. 1 in an implementation consistent with the principles of the invention.

FIG. 3 is an exemplary diagram of master 130 in an implementation consistent with the principles of the invention. Master 130 may include a bus 310, a processor 320, a main memory 330, a ROM 340, a storage device 350, one or more input devices 360, one or more output devices 370, and a communication interface 380. Bus 310 may include one or more conductors that permit communication among the components of master 130.

Processor 320 may include any type of conventional processor or microprocessor that interprets and executes instructions. Main memory 330 may include a RAM or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive. For example, storage device 350 may include one or more local disks 355 that provide persistent storage.

Input devices 360 may include one or more conventional mechanisms that permit an operator to input information to master 130, such as a keyboard, a mouse, a pen, voice recognition and/or biometric mechanisms, etc. Output devices 370 may include one or more conventional mechanisms that output information to the operator, including a display, a printer, a speaker, etc. Communication interface 380 may include any transceiver-like mechanism that enables master 130 to communicate with other devices and/or systems. For example, communication interface 380 may include mechanisms for communicating with chunk servers 120 and clients 110.

Figure 4:
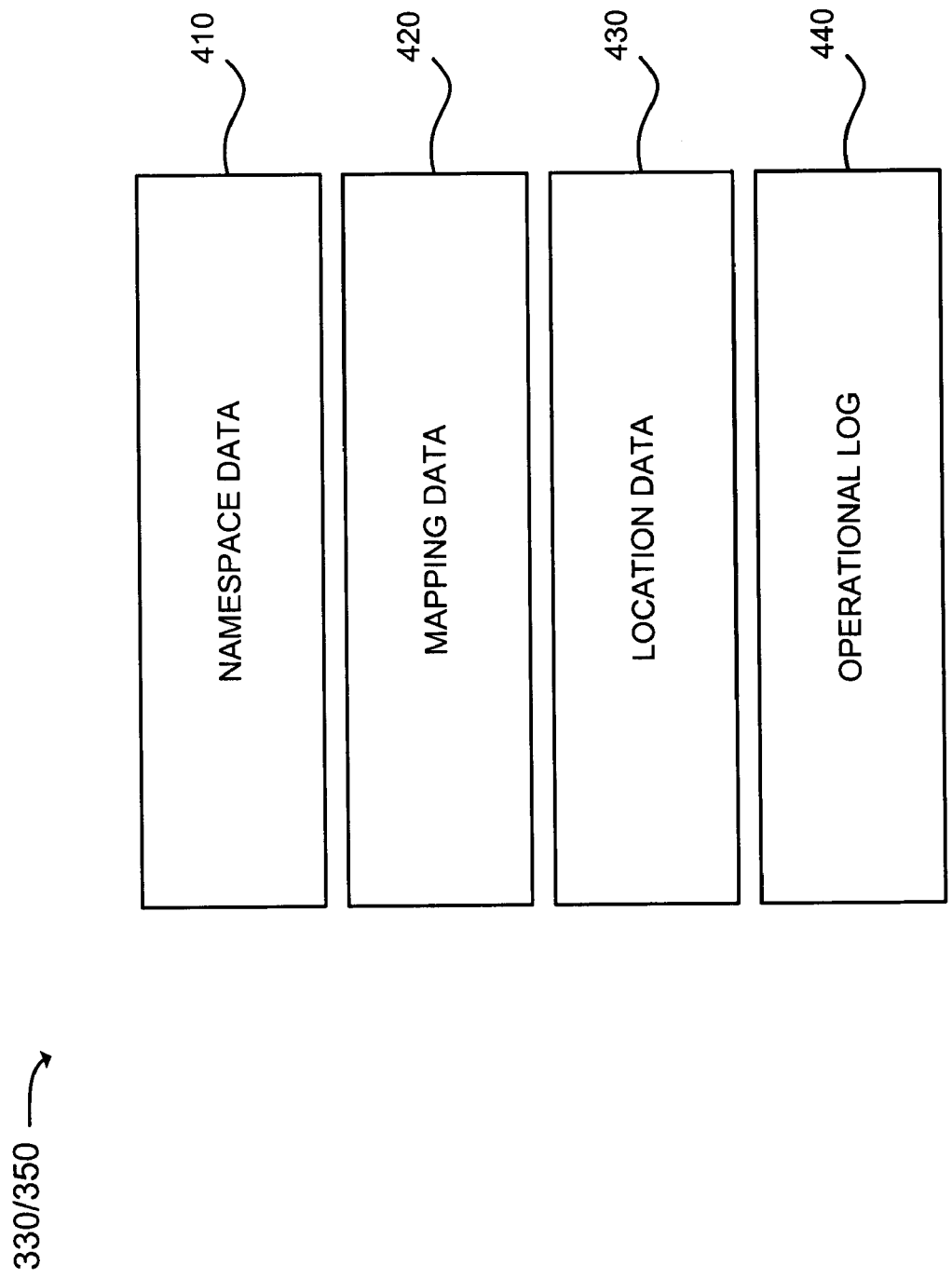
FIG. 4 is an exemplary diagram of a memory architecture that may be used by the master of FIG. 3 according to an implementation consistent with the principles of the invention.

Master 130 may maintain file system metadata within one or more computer readable mediums, such as main memory 330 and/or storage device 350. FIG. 4 is an exemplary diagram of metadata that may be maintained by master 130 according to an implementation consistent with the principles of the invention. In one implementation, master 130 maintains less than 64 bytes of metadata for each 64 MB chunk. The metadata may include namespace data 410, mapping data 420, location data 430, and an operational log 440.

Namespace data 410 may include data corresponding to the names of files stored (as chunks) by chunk servers 120. The file names may be organized hierarchically in a tree of directories and identified by pathnames. Master 130 may store namespace data 410 in a compact form that uses prefix-compression to store file names. As a result, namespace data 410 may need less than 64 bytes per file.

Mapping data 420 may include data that maps the file names to the chunks to which the file names correspond. A chunk may be identified by a chunk handle that encodes a timestamp and possibly a chunk type. In one implementation, the chunk handle includes a 64-bit value.

The timestamp may include a physical timestamp or a logical timestamp. Master 130 may generate a physical timestamp by reading a local clock. The use of physical timestamps, however, may require synchronization of clocks maintained by master 130 and chunk servers 120. Instead, master 130 may use a logical timestamp. Master 130 may generate a logical timestamp by incrementing a value at each operation. The timestamp may be used as a version number for a chunk.

Location data 430 may include information identifying the locations of chunk replicas. In an implementation consistent with the principles of the invention, this information is not persistently stored by master 130. Instead, master 130 may obtain this information at startup by communicating directly with chunk servers 120 to discover the chunks stored at each chunk server 120. Master 130 can keep itself up-to-date thereafter because it has sole control over all chunk placement and migration decisions and monitors the state of chunk servers 120 using regular heartbeat messages. Master 130 may periodically exchange heartbeat messages with chunk servers 120 to send instructions and receive information concerning the state of chunk servers 120. Master 130 may also exchange other instructions and information with chunk servers 120. For example, master 130 may send an instruction to chunk servers 120 to provide identification of the chunks stored by chunk servers 120 (i.e., chunk location information, including chunk handles and version numbers for the chunks), which gives master 130 an idea of the space utilization of chunk servers 120.

Circumstances might arise that cause chunks to become unavailable. For example, errors on chunk servers 120 may cause chunks to vanish spontaneously (e.g., a disk 275 may fail or be disabled). Also, a chunk server 120 may be renamed by an operator, thereby causing all chunks stored by that chunk server 120 to become temporarily unreachable. Master 130 may become cognizant of the location of the chunk replicas by periodically instructing chunk servers 120 to provide chunk location information.

Operation log 440 may include a persistent historical record of critical metadata changes, such as changes to namespace data 410 and mapping data 420. This historical record may serve as a logical timeline that defines the order of concurrent operations. Files and chunks, as well as their versions, may be uniquely and eternally identified by the logical times at which they were created. Master 130 may append log records to the end of previous log records, possibly in batches. Operation log 440 may allow the state of master 130 to be updated simply, reliably, and without risking inconsistencies in the event of a master 130 crash.

Because of the importance of operation log 440, master 130 may store it reliably and not make changes visible to clients 110 until metadata modification are made persistent. Operation log 440 may be replicated on multiple master replicas and respond to clients 110 after the log record for an operation is written. A log record may be considered written after it has been flushed to persistent local memory by master 130, as well as all master replicas.

Master 130 may restore its file system state by replaying operation log 440. To minimize startup time, operation log 440 may be kept reasonably small. Master 130 may checkpoint the state whenever operation log 440 grows beyond a certain size. Thus, when master 130 starts up, it can restore its state by beginning from the most recent checkpoint and replaying only the log records after the checkpoint file. The checkpoint may be written as a compact B-tree that can simply be mapped into memory and used to serve namespace lookup requests without further parsing. This speeds up recovery in the event of a failure and, thereby, improves the availability of the file system.

Because scanning the internal structures of master 130 to build a checkpoint can take seconds or minutes, the internal state of master 130 may be structured in such a way that a new checkpoint can be created without delaying any incoming requests that may alter the internal state of master 130. Master 130 may switch to a new log file and start a background thread to create the checkpoint. The new checkpoint may include any operations that precede the switch to the new log file. When the checkpoint is complete, master 130 may write the checkpoint to its local memory (and possibly to the local memories of master replicas).

During recovery, master 130 may read the latest complete checkpoint from its local memory and any log files whose contents are not reflected in that checkpoint. Older log files and checkpoints can be deleted (though a few older versions may be kept to guard against catastrophes). A failure during checkpointing may have no effect on the correctness of operational log 440 because the recovery code may detect and skip incomplete checkpoints.

Because master 130 stores the metadata in its local memory, master 130 can perform fast operations. Also, master 130 can periodically and efficiently scan through its entire state. This periodic scanning frees master 130 to perform other operations, such as namespace management and locking; creation, re-replication, and rebalancing of chunk replicas; and garbage collection. These operations will be described in more detail below.

Namespace Management and Locking

Many operations performed by master 130 can take a long time. So as not to delay other operations by master 130 while long-running operations are in progress, master 130 may perform multiple operations in parallel. Master 130 may use a simple internal locking scheme over regions of the namespace that permits such operations to proceed in parallel without interfering with each other.

Figure 5:
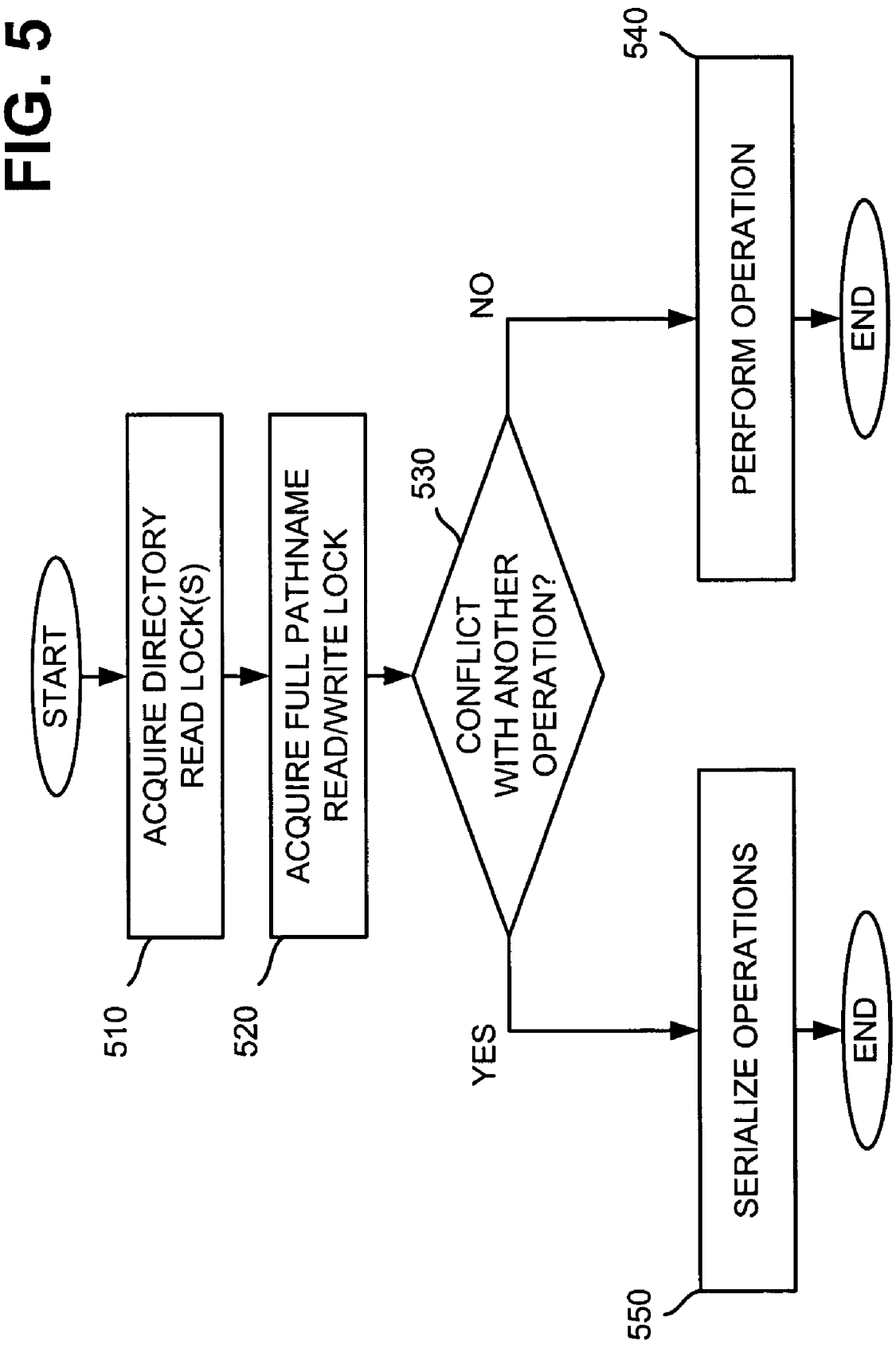
FIG. 5 is a flowchart of exemplary processing for implementing an internal locking scheme according to an implementation consistent with the principles of the invention.

FIG. 5 is a flowchart of exemplary processing for implementing an internal locking scheme according to an implementation consistent with the principles of the invention. Each node in the namespace tree (either an absolute filename or an absolute directory name) has an associated read-write lock. Each operation on master 130 may acquire a set of locks before being executed. The operation may acquire read locks on the names of one or more directories included in the pathname (act 510). The operation may also acquire a read or write lock on the full pathname (act 520).

For example, if a pathname of the form /d1/d2/ . . . /dn/leaf is involved in an operation (where d1, d2, . . . , and dn refer to directories and leaf refers to either a file or a directory, depending on the operation), the operation may acquire read locks on the directory names (or partial pathnames)/d1, /d1/d2, . . . , /d1/d2/dn. The operation may also acquire a read or write lock on the full pathname /d1/d2/ . . . /dn/leaf.

Master 130 may determine whether the locks acquired by the operation conflict with locks acquired by another operation (act 530). Master 130 may use a lazily allocated data structure (e.g., a hash table) that maps from paths (e.g., partial and full pathnames) to read-write locks to make this determination. If the locks do not conflict, then master 130 may perform the operation (act 540). If the locks conflict, however, master 130 may serialize the operations, performing one operation after another (act 550). The particular order in which the operations are performed may be programmable.

To illustrate this, assume that a file creation operation for /home/user/foo commences while a snapshot operation of /home/user to /save/user is in progress. The snapshot operation acquires read locks on /home and /save and acquires write locks /home/user and /save/user. The file creation operation acquires read locks on /home and /home/user and a write lock on /home/user/foo. Master 130 may serialize the two operations because they try to obtain conflicting locks on /home/user.

This locking scheme permits concurrent operations to take place in the same directory. For example, multiple file creation operations can be executed in the same directory. Assume that a create operation acquires a read lock on the directory name and a write lock on the filename. The read lock on the directory name suffices to prevent the directory from being deleted, renamed, or snapshotted. The per-file write locks serialize any attempts to create a file with the same name twice.

Since the namespace can have a large number of nodes, read-write lock objects may be allocated lazily and deleted as soon as they are not in use. Also, locks may be acquired in a consistent total order to prevent deadlock. For example, the locks may first be ordered by level in the namespace tree and then lexicographically within the same level.

Creation, Re-Replication, and Rebalancing of Chunk Replicas

As described above, a file may be divided into one or more chunks. Master 130 may create chunks of a file and spread placement of the chunks, as chunk replicas, across chunk servers 120. Placement of a replica of a chunk may be independent of the placement of other replicas associated with the same chunk and the placement of replicas associated with other chunks associated with the same or different files. Master 130 may create chunk replicas for three reasons: chunk creation, chunk re-replication, and chunk rebalancing.

Figure 6:
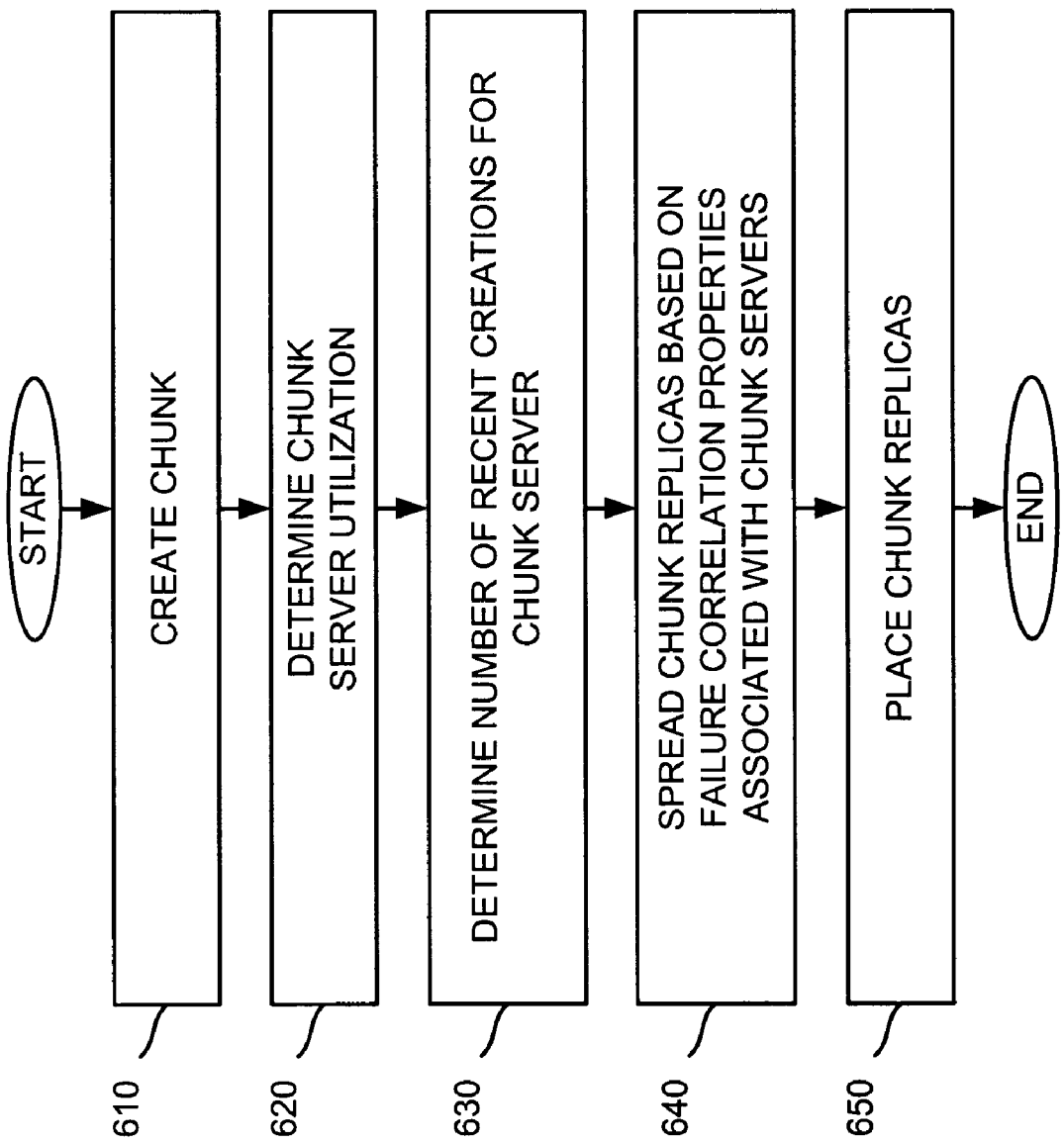
FIG. 6 is a flowchart of exemplary processing for creating chunks according to an implementation consistent with the principles of the invention.

FIG. 6 is a flowchart of exemplary processing for creating chunks according to an implementation consistent with the principles of the invention. Processing may begin when master 130 creates a chunk (act 610). Master 130 may then decide which of chunk servers 120 will store replicas of the chunk. Master 130 may take several factors into consideration when determining where to place the chunk replicas. For example, master 130 may identify underutilized chunk servers 120 (act 620). Master 130 may determine which chunk servers 120 have a below-average disk-space utilization. Master 130 may make this determination based on the chunk location information that master 130 periodically receives from chunk servers 120. Over time, this may ensure uniform disk utilization across chunk servers 120.

Master 130 may also identify chunk servers 120 that have been involved in "recent" chunk creations (act 630). Master 130 may attempt to evenly spread recent creations across all chunk servers 120 so as to minimize the number of recent creations on each chunk server 120. One reason to minimize the number of recent creations on a chunk server 120 is that a chunk creation reliably predicts imminent heavy write traffic because chunks are typically created when demanded by writes. Therefore, master 130 may attempt to spread the write load as widely as possible across chunk servers 120 to avoid possible write bottlenecks.

Master 130 may then spread the chunk replicas based on failure correlation properties associated with chunk servers 120 (act 640). Failure correlation properties may refer to system conditions that may concurrently affect the availability of two or more chunk servers 120. The file system (FIG. 1) may include hundreds of chunk servers 120 spread across many device racks. These chunk servers 120 may be accessed by hundreds of clients 110 on the same or different racks. Communication between two devices on different racks (e.g., between any two of master 130, chunk servers 120, and/or clients 110) may cross one or more network switches. Additionally, bandwidth into and out of a rack may be limited to less than the maximum aggregate bandwidth of all the devices within the rack. Therefore, it may be beneficial to spread chunk replicas across racks. When this is done, chunk replicas may remain available even in the event of a failure of an entire rack of chunk servers 120.

Master 130 may then place the chunk replicas based on the above processing (act 650). For example, master 130 may instruct selected ones of chunk servers 120 to store replicas of the chunk. This may involve master 130 instructing one or more chunk servers 120 to create a chunk and associate a version number with it.

The chunk replica placement policy may serve two goals: maximize data reliability and availability, and maximize network bandwidth utilization. For both, it may not be enough to spread replicas across chunk servers 120, which guards against disk and chunk server 120 failures and fully utilizes each chunk server's network bandwidth. It may also be beneficial to spread chunk replicas across racks to ensure that some replicas of a chunk will survive and remain available even if an entire rack is damaged or taken offline (e.g., due to failure of a shared resource, such as a network switch or power circuit). This may also mean that traffic, especially reads, for a chunk can exploit the aggregate bandwidth of multiple racks.

Figure 7:
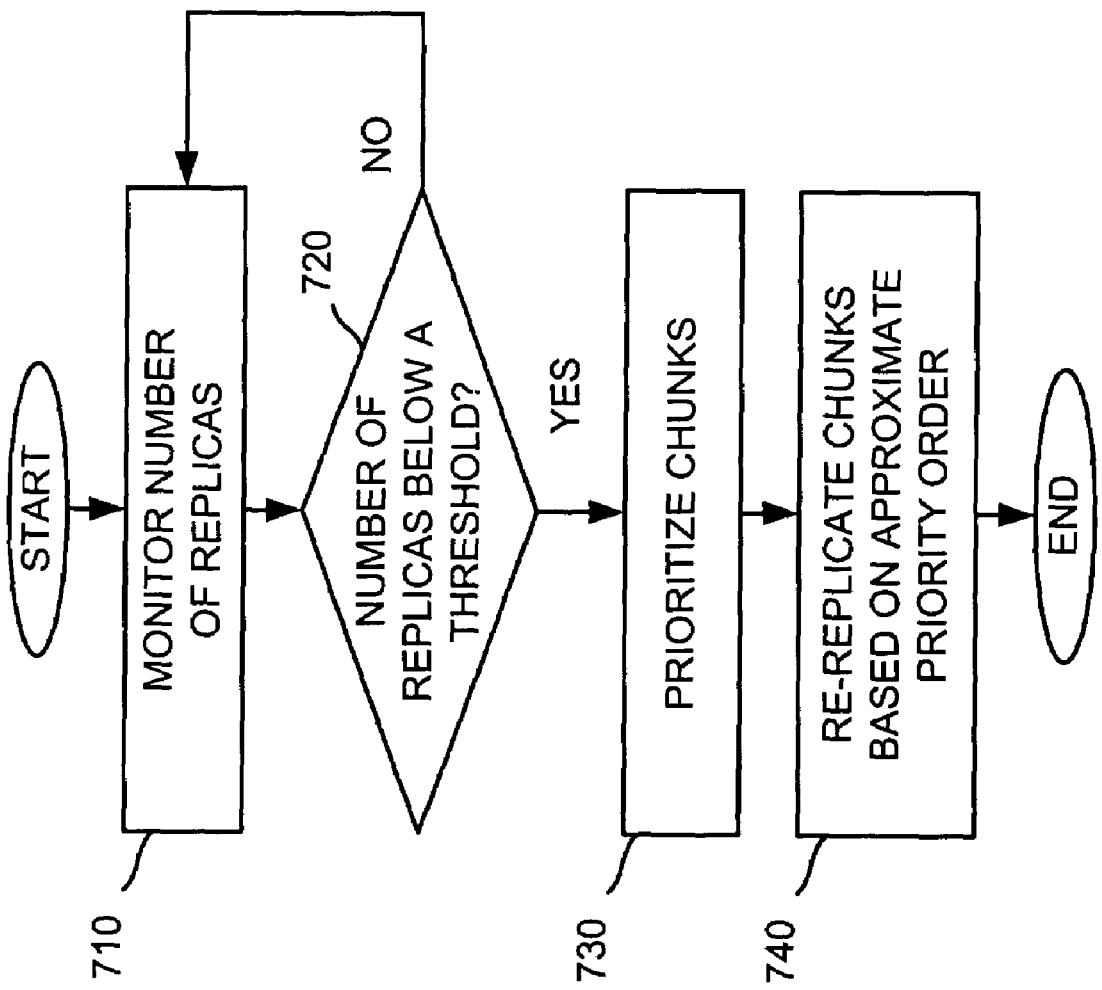
FIG. 7 is a flowchart of exemplary processing for re-replicating a chunk according to an implementation consistent with the principles of the invention.

FIG. 7 is a flowchart of exemplary processing for re-replicating a chunk according to an implementation consistent with the principles of the invention. Master 130 may monitor the number of available replicas for each chunk stored by chunk servers 120 (act 710). Master 130 may use the chunk location information gathered from chunk servers 120 to determine the number of available replicas for a chunk. Master 130 may then determine whether the number of available replicas for a chunk has fallen below a replication threshold (act 720). The replication threshold may be user-configurable for all chunks, on a per-chunk basis, or for each class/type of chunks (e.g., a class might include all chunks within the same part of the namespace). In one implementation, the threshold is set to three for all chunks.

The number of available replicas may be less than the replication threshold for a number of reasons. For example, a chunk server 120 may become unreachable or report that its replica may be corrupted or that one of its disks has been disabled because of errors. Alternatively, the replication threshold may be changed to require additional replicas.

Master 130 may prioritize the chunks that need to be re-replicated (act 730). Master 130 may prioritize chunks based on how far the chunks are from their replication threshold. For example, master 130 may give a higher priority to a chunk that has lost two of its replicas than to a chunk that has lost only one replica. Also, master 130 may increase priority for chunks associated with active files and decrease priority for chunks associated with files that have been recently deleted. In addition, master 130 may give higher priority to any chunk that is blocking client 110 progress to minimize the impact of failures on applications running on (or associated with) client 110.

Master 130 may then select a chunk based on an approximate priority order and re-replicate (clone) it (act 740). Approximate priority order means that master 130 may deviate from the priority order to make forward progress. Master 130 may instruct a chunk server 120 to copy the chunk data directly from an existing valid replica. To keep cloning traffic from overwhelming client traffic, master 130 may limit the total number of concurrent clone operations and, possibly, the number of concurrent clone operations per chunk server 120. In addition, chunk servers 120 may limit the amount of bandwidth they consume in a single clone operation. Master 130 may determine where to place the new replica using factors, such as those described above with regard to FIG. 6.

Figure 8:
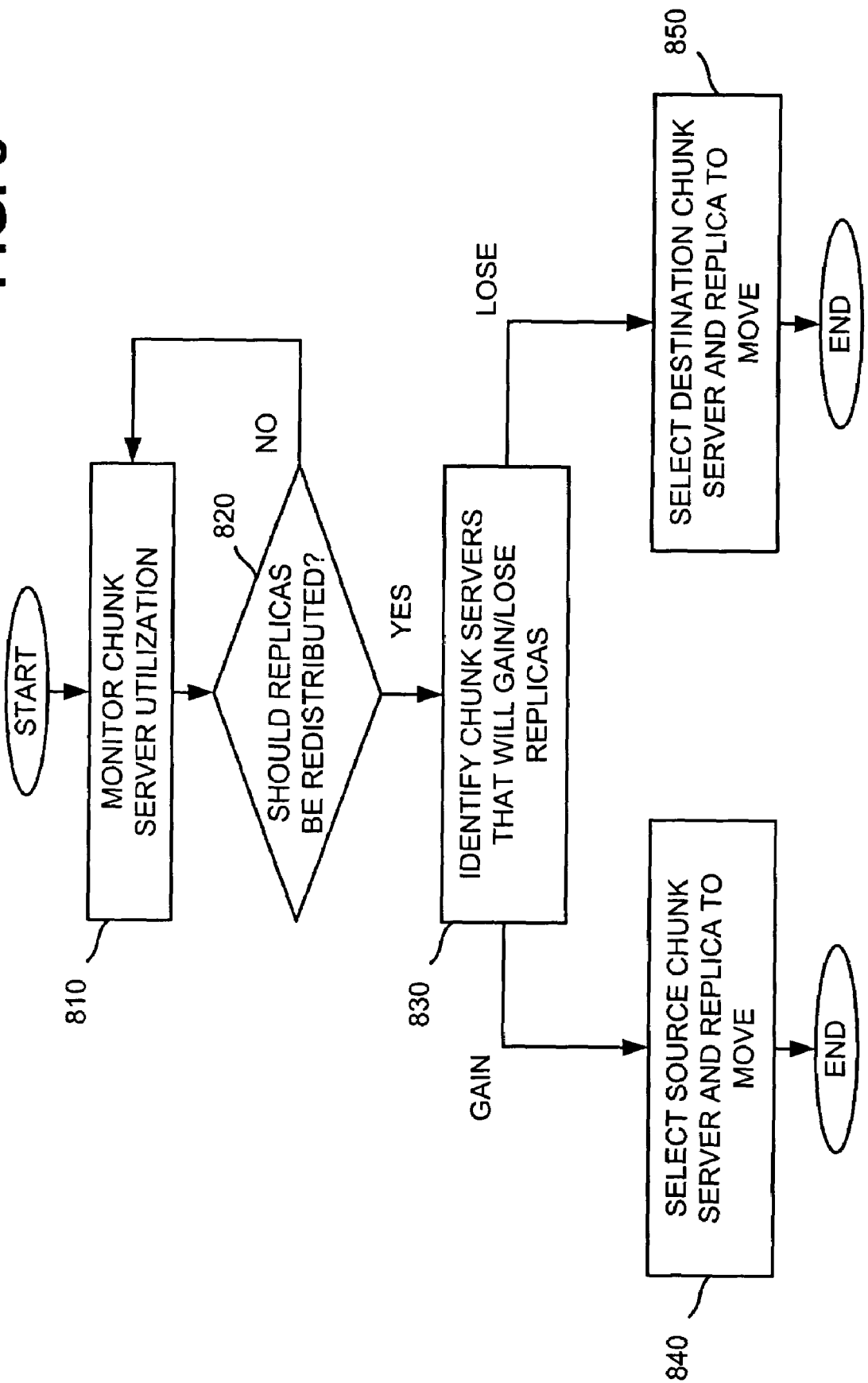
FIG. 8 is a flowchart of exemplary processing for rebalancing replicas according to an implementation consistent with the principles of the invention.

FIG. 8 is a flowchart of exemplary processing for rebalancing replicas according to an implementation consistent with the principles of the invention. Master 130 may monitor the utilization of chunk servers 120 (act 810). Master 130 may determine chunk server utilization by periodically requesting information from chunk servers 120 regarding the replicas stored by chunk servers 120. Master 130 may determine, based on the chunk server utilization, whether any replicas should be redistributed (or moved to another chunk sever 120) (act 820). Master 130 may decide to redistribute replicas for better load balancing. Master 130 may also decide to redistribute replicas to gradually fill up a new chunk server 120 over time rather than instantly swamping it with new chunks and the heavy write traffic that comes with them.

If master 130 determines that replicas should be redistributed, master 130 may identify chunk servers 120 that will gain/lose replicas (act 830). For example, master 130 may prefer to move a replica from a chunk server 120 with below-average free disk space to a chunk server 120 with plenty of free disk space. Once master 130 identifies a chunk server 120 to gain a replica, master 130 may select a source chunk server 120 and a replica to move from that chunk server 120 (act 840). Once master 130 identifies a chunk server 120 to lose a replica, master 130 may select a destination chunk server 120 and a replica to move to that chunk server 120 (act 850). Master 130 may use factors, such as those described above with regard to FIG. 6, when selecting the source and destination chunk servers. The actual moving of a replica may involve the deletion of the replica from the current chunk server 120 and the instruction of another chunk server 120 to copy chunk data directly from an existing valid replica.

Garbage Collection

Figure 9:
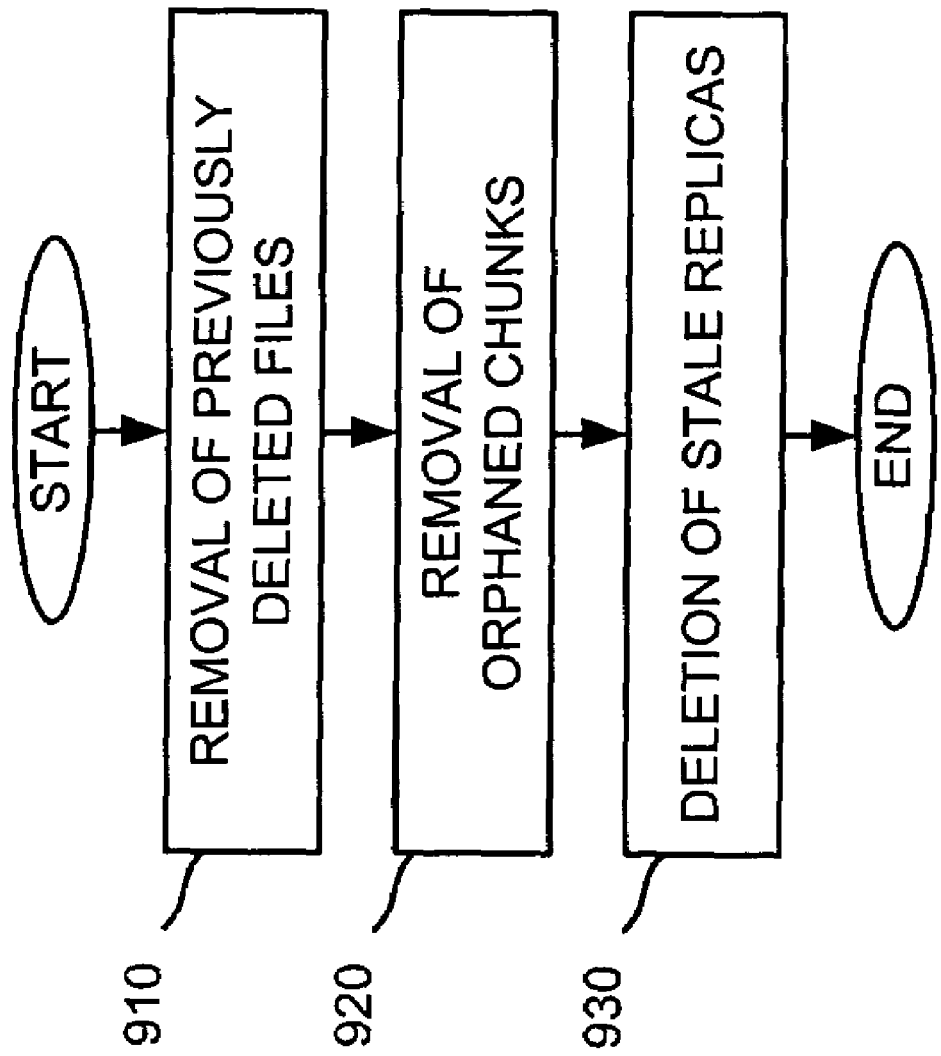
FIG. 9 is a flowchart of exemplary processing that may occur when performing garbage collection according to an implementation consistent with the principles of the invention.

Master 130 may perform garbage collection to delete files, orphaned chunks, and stale replicas. FIG. 9 is a flowchart of exemplary processing that may occur when performing garbage collection according to an implementation consistent with the principles of the invention. Master 130 may perform the removal of previously deleted files (act 910). For example, when a file is deleted by client 110 (e.g., via a deletion instruction from client 110), master 130 may log the deletion almost immediately just like any other change to a file. Master 130 may, however, actually only rename the file with a deletion timestamp. The file may still be read under the new, special name. The file can also be undeleted by renaming it back to its original name. For example, client 110 may send an un-deletion instruction to master 130, requesting that the previously deleted file be restored.

A user-configurable amount of time after the deletion when master 130 identifies the file during its regular scan of namespace data 410 (FIG. 4), master 130 may permanently delete the file by erasing the file's metadata. This effectively severs the file's links to its chunks. Each chunk server 120 may periodically inquire of master 130 about a set of chunks that it stores. Master 130 may reply to a chunk server 120 by identifying which of those chunks (if any) that have been deleted (e.g., chunks for which master 130 has erased their metadata). Chunk server 120 may then be free to delete its replicas of these chunks.

Master 130 may also perform the deletion of orphaned chunks by deleting its internal record of the existence of the orphaned chunks (act 920). Orphaned chunks may include those chunks that are not reachable from any file name. Master 130 may identify orphaned chunks during its regular scan of namespace data 410 and/or mapping data 420. When master 130 identifies an orphaned chunk, master 130 may erase its metadata. After master 130 erases the metadata for a chunk, that chunk no longer exists as far as master 130 is concerned.

When a chunk server 120 later inquires of master 130 about a set of chunks that it stores, master 130 may identify those chunks (if any) that no longer exist. Chunk server 120 may then safely delete these chunks.

Master 130 may also perform deletion of stale replicas of chunks (act 930). A chunk replica may become out-of-date (or stale) if a chunk server 120 fails or otherwise misses modifications to the data. Master 130 may maintain chunk versions (as described above) to differentiate current replicas from stale replicas. A new chunk version may come into existence whenever master 130 grants a new lease to the chunk (leasing will be described in more detail below).

Creating a new version merely means that master 130 and those chunk servers 120 that store a replica of the chunk record a new chunk version number in their persistent memory. If another chunk server 120 also stores a replica of the chunk, but is currently down, then its chunk version number will not be advanced. Master 130 may detect that this chunk server 120 has a stale replica the next time that chunk server 120 inquires of master 130 about a set of chunks and their associated version numbers that it stores.

Master 130 may delete stale replicas in a manner similar to that described above with regard to orphaned chunks. Before that, master 130 may effectively consider a stale replica to not exist at all when it replies to client requests for chunk information. As another safeguard, master 130 may include the chunk version number when it informs a client 110 which chunk server 120 holds a lease on a chunk or when it instructs a chunk server 120 to read a chunk from another chunk server 120 in a cloning operation. Clients 110 and chunk servers 120 may verify the version number when they perform an operation to guarantee that they are accessing up-to-date data.

The garbage collection approach to storage reclamation offers several advantages over eager deletion (i.e., deleting data right away). First, it is simple and reliable in a large-scale distributed system where component failures are common. Chunk creation may succeed on some chunk servers 120, but not others, leaving replicas that master 130 does not know exist. Replica deletion messages may get lost and master 130 has to remember to resend them across failures, both its own and a chunk server's. Garbage collection provides a uniform and dependable way to clean up any replicas not known to be useful.

Second, the garbage collection approach merges storage reclamation into the regular background activities of master 130, such as the regular scans of namespace data 410 (FIG. 4) and exchanges of heartbeat messages with chunk servers 120. Thus, it is done in batches and the cost is amortized. Moreover, it may be done when master 130 is relatively free. As a result, master 130 can respond more promptly to client requests that demand timely attention.

Third, the delay in reclaiming storage provides a safety net against accidental, irreversible deletion. Storage reclamation may be expedited by explicitly deleting a deleted file again. Also, users may be permitted to apply different replication and reclamation policies to different parts of the namespace. For example, a directory could be designated for temporary files. Chunks for files in this directory may be stored with a single replica. Any deleted files in this directory may be immediately and irrevocably removed by master 130.

System Interactions

Clients 110, chunk servers 120, and master 130 may interact to perform reads, writes, atomic record appends, and snapshots. The file system (FIG. 1) has been designed to minimize master 130 involvement in all operations. For example, a client 110 does not read or write file data through master 130. Instead, a client 110 asks master 130 which chunk server 120 it should contact. Client 110 may thereafter interact directly with that chunk server 120.

Each of the above operations will now be described in more detail.

Read Operation

Figure 10:
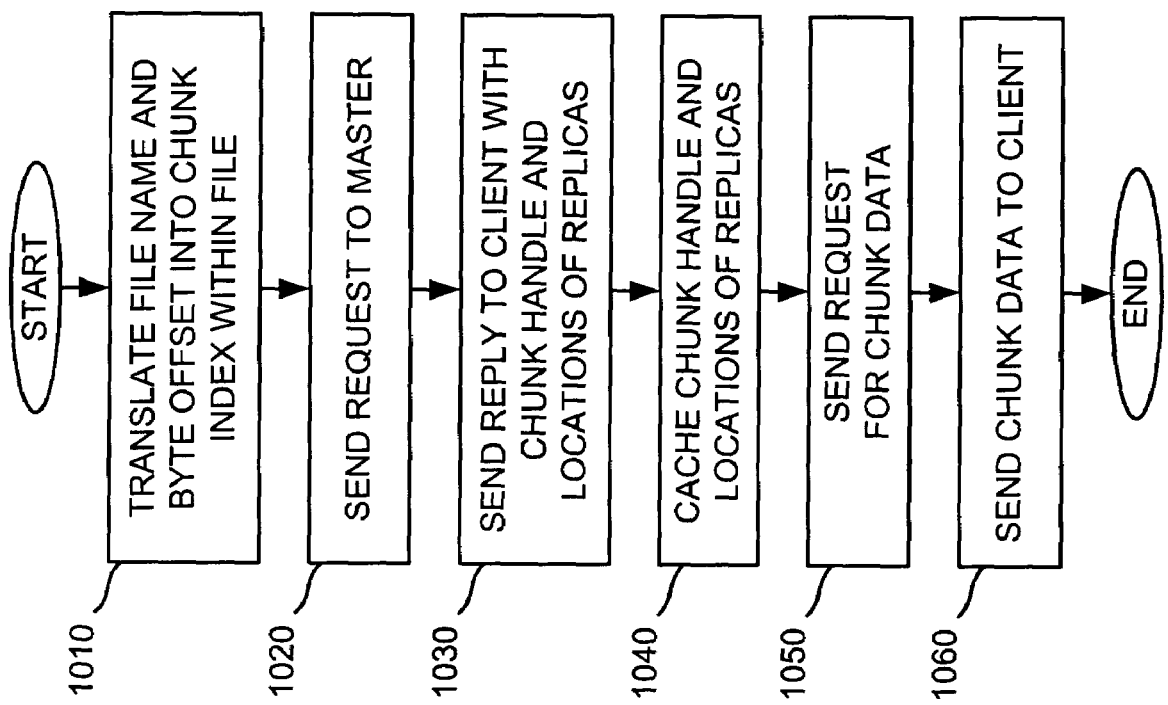
FIG. 10 is a flowchart of exemplary processing for performing a read operation according to an implementation consistent with the principles of the invention.
Figure 11:
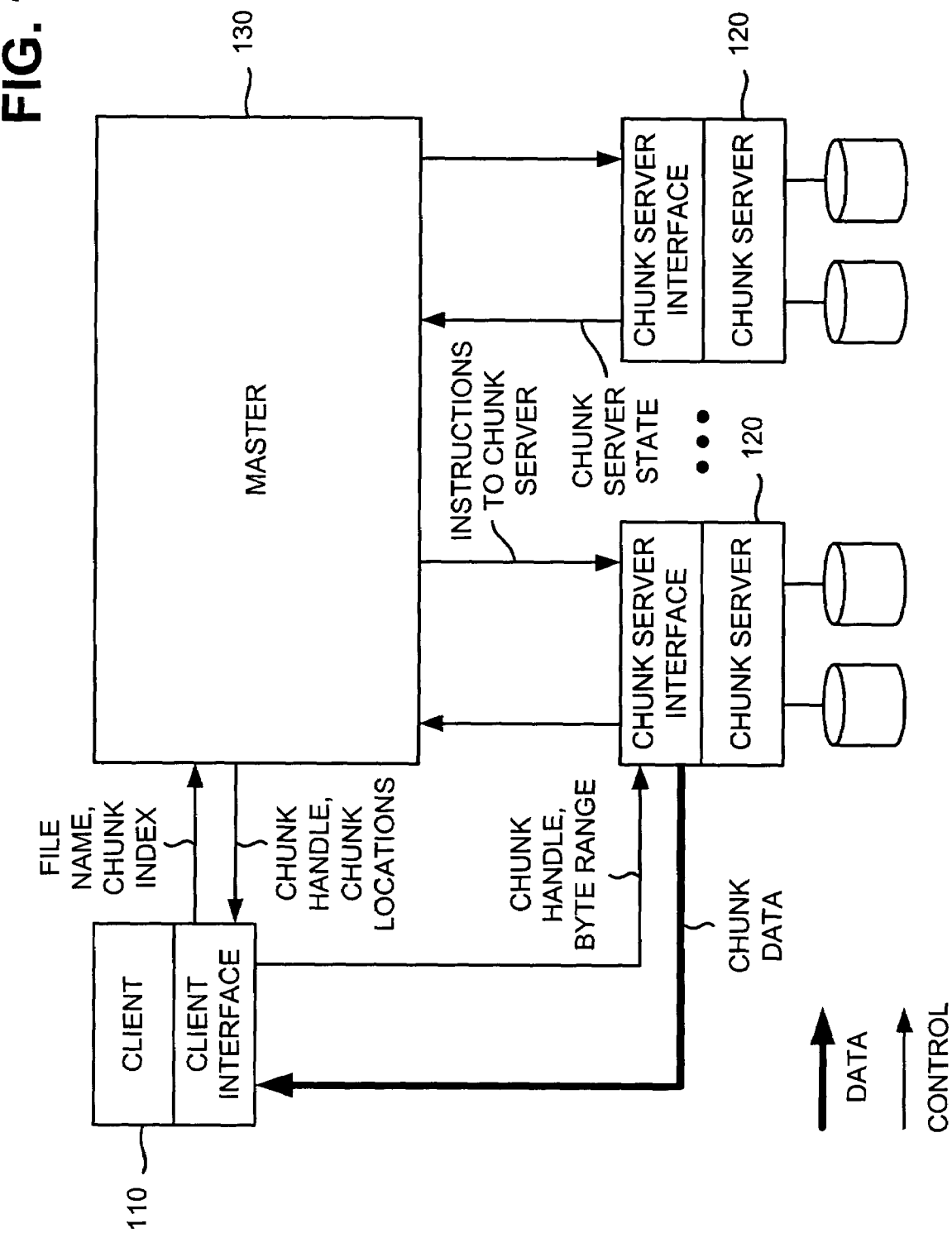
FIG. 11 is an exemplary block diagram illustrating the interactions between a client, one or more chunk servers, and a master when performing a read operation according to an implementation consistent with the principles of the invention.

FIG. 10 is a flowchart of exemplary processing for performing a read operation according to an implementation consistent with the principles of the invention. FIG. 11 is an exemplary block diagram illustrating interactions among a client 110, one or more chunk servers 120, and master 130 when performing a read operation according to an implementation consistent with the principles of the invention. When a client 110 wants to read data from a file, client 110 may translate the file name and byte offset corresponding to the desired data into a chunk index within the file (act 1010). Client 110 may use the maximum chunk size (e.g., 64 MB) to determine the chunk index. Alternatively, master 130 may perform the translation to generate the chunk index.

Client 110 may then send a request to master 130 (act 1020). As shown in FIG. 11, the request may include the file name and the chunk index. Master 130 may use the file name and chunk index to identify the chunk data requested by client 110. For example, master 130 may use namespace data 410, mapping data 420, and location data 430 (FIG. 4) to determine the chunk handle associated with the chunk data and locations of the replicas of this chunk data. Master 130 may then respond to client 110 with this information. As shown in FIG. 11, master 130 may send a reply to client 110 that includes the chunk handle and locations of the replicas (act 1030).

Client 110 may cache the chunk handle and replica locations using, for example, the file name and the chunk index as a key (act 1040). Client 110 may cache this information to facilitate further reads from the same chunk. This way, client 110 need not interact any further with master 130 for additional reads from the same chunk until the cached information expires. Cached information may be configured to expire after a predetermined (possibly user configurable) amount of time.

Client 110 may send a request for the chunk data to one of chunk servers 120 (act 1050). The particular chunk server 120 to which client 110 sends the request may be determined based on the relative locations of client 110 and those chunk servers 120 that store replicas of the chunk data. For example, client 110 may send the request to the closest chunk server 120 in the network topology. As shown in FIG. 11, the request may include the chunk handle and a byte range within that chunk. Chunk server 120 may send the requested chunk data to client 110 (act 1060).

For efficiency, client 110 may typically ask for information associated with multiple chunks from master 130 in the same request. In addition or alternatively, master 130 may include information for chunks immediately following those requested by client 110. This extra information may avoid several future client-master interactions at practically no cost.

Write Operation

Each write, or other data-modifying operation, to a chunk is performed to all chunk replicas. Leases may be used to maintain a consistent modification order across replicas. Master 130 may grant a chunk lease to one of chunk servers 120 that stores a replica, which may be called the "primary" replica. Other chunk servers 120 storing the same replica may be called the "secondary" replicas. The primary replica selects a serial order for all modifications to the chunk. The primary replica may provide this serial order to the secondary replicas in the form of control signals. All of the secondary replicas follow this order when applying modifications. This lease mechanism may ensure a global order on all modifications to a chunk. The order may be defined first by the lease grant order on master 130, and within a lease, by the serial numbers assigned by the primary replica.

The lease mechanism minimizes management overhead of master 130. The lease may have an initial timeout period (e.g., 60 seconds), which may be extendable by the primary replica. For example, as long as a chunk is being modified, the primary replica can request and typically receive extensions from master 130 indefinitely. These extension requests and grants may be piggybacked on the heartbeat messages regularly exchanged between master 130 and chunk servers 120. If master 130 loses communication with the primary replica, it can safely grant a new lease to another replica after the old lease expires. Master 130 may sometimes attempt to revoke a lease before it expires (e.g., when master 130 wants to disable modifications to a file that is being renamed).

Figure 12:
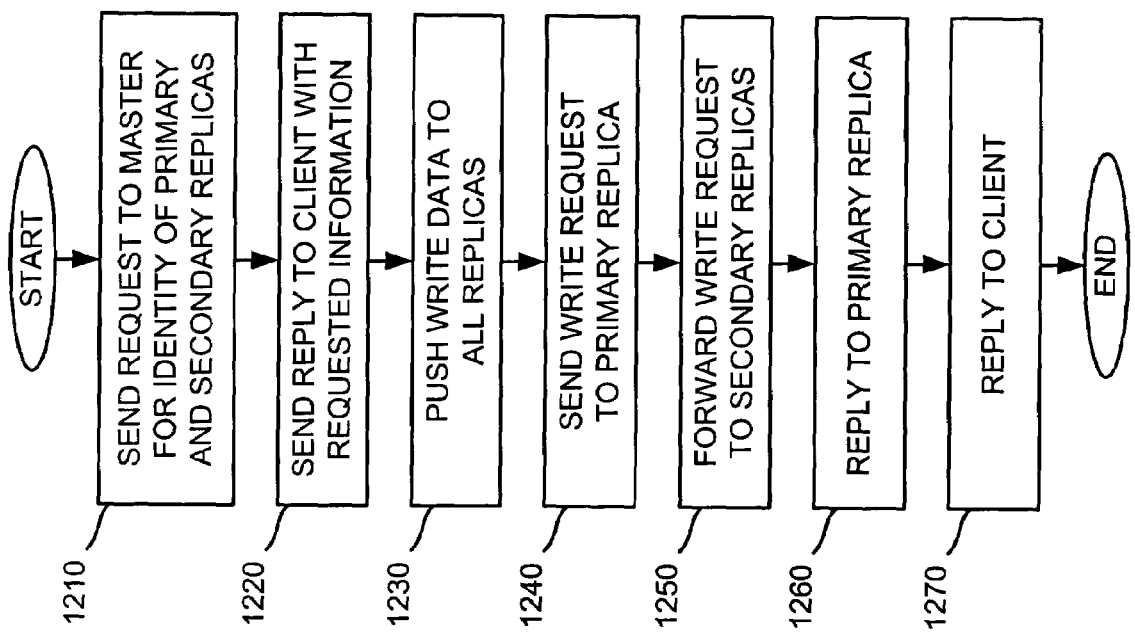
FIG. 12 is a flowchart of exemplary processing for performing a write operation according to an implementation consistent with the principles of the invention.
Figure 13:
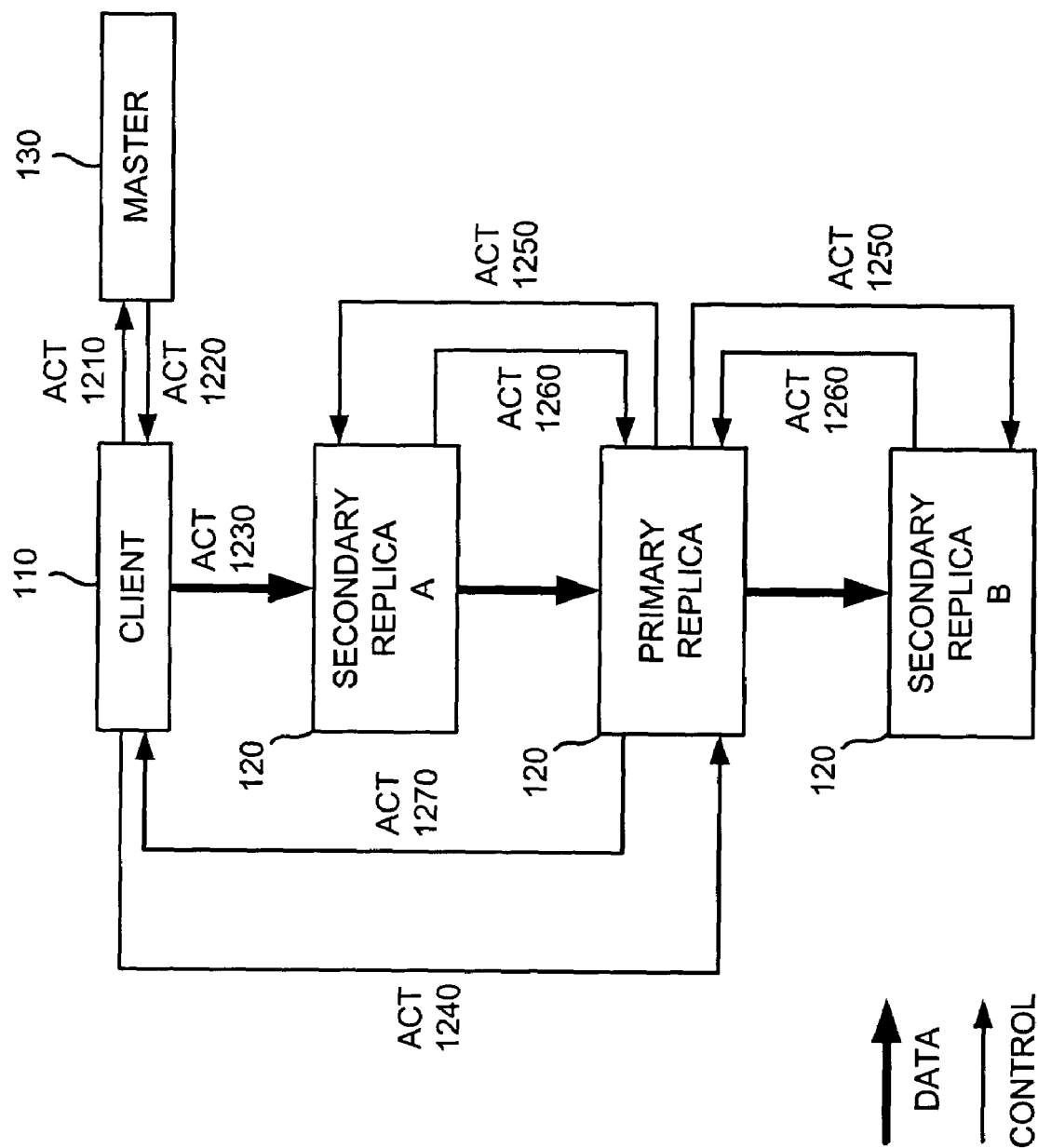
FIG. 13 is an exemplary block diagram illustrating the interactions between a client, one or more chunk servers, and a master when performing a write operation according to an implementation consistent with the principles of the invention.

FIG. 12 is a flowchart of exemplary processing for performing a write operation according to an implementation consistent with the principles of the invention. FIG. 13 is an exemplary block diagram illustrating interactions among a client 110, one or more chunk servers 120, and master 130 when performing a write operation according to an implementation consistent with the principles of the invention. While FIGS. 12 and 13 will be described in terms of a write operation, the described acts may also apply to other data-modifying operations.

When a client 110 has data to write, client 110 sends a request to master 130 for the identity of one of chunk servers 120 that holds the current lease for the chunk (i.e., the primary replica) and the locations of the other replicas (i.e., the secondary replicas) (act 1210). If no chunk server 120 currently has a lease, master 130 may grant a lease to one of chunk servers 120 that stores a replica of the chunk. That chunk server 120 would then be the primary replica and other chunk servers 120 storing a replica of the chunk would be secondary replicas.

Master 130 may then send a reply to client 110 with the requested information (act 1220). The reply may include the identity of the primary replica and the locations of the secondary replicas. Client 110 may cache this information and use it for further modifications involving the chunk. Client 110 need only contact master 130 again when the primary replica becomes unreachable or replies that it no longer holds a lease.

Client 110 may push the write data to all of the replicas (act 1230). Client 110 may push the data in any order it wants. The primary and secondary replicas may store the data in an internal buffer (or cache) until the data is used or aged out (e.g., expires). To use network bandwidth efficiently, the flow of data being written may be decoupled from the flow of control information. Because inter-switch links may be potential bandwidth bottlenecks, data may be written so as to minimize the use of inter-switch links and high latency links.

Client 110 may send the write data to the replica that is closest to it in the network topology. The closest replica may or may not be the primary replica. As shown in FIG. 13, secondary replica A is closest to client 110. Secondary replica A may forward the data to the replica that is closest to it among the remaining replicas in the network topology. As shown in FIG. 13, the primary replica is closest to secondary replica A. The primary replica may forward the data to the replica that is closest to it among the remaining replicas in the network topology. As shown in FIG. 13, secondary replica B is closest to the primary replica. This process may continue until all of the replicas receive the write data.

If the network topology is simple, distances can be easily estimated by examining Internet protocol (IP) addresses. Therefore, client 110 may choose a linear ordering of the replicas to construct a data stream. Pushing of the write data may be done in a linear fashion to fully utilize the network bandwidth of each replica.

Latency may be minimized by pipelining the data transfer over TCP connections. Client 110 may start writing on a stream connected to secondary replica A. While secondary replica A receives data from client 110, it may start forwarding the data to the next replica (e.g., the primary replica). Similarly, while the primary replica receives data from secondary replica A, it may begin forwarding the data to secondary replica B.

Once all of the replicas have acknowledged receiving the data, client 110 may send a write request to the primary replica (act 1240). The write request may identify the write data that was previously pushed to all of the replicas. The primary replica may validate the write request and then apply the write request to data stored in its local memory in the assigned serial order. The primary replica may assign consecutive serial numbers to all write requests that it receives, possibly from multiple clients 110.

The primary replica may forward the write request to all of the secondary replicas (act 1250). Each of the secondary replicas may apply the received write requests in the assigned serial number order. The secondary replicas may then reply to the primary replica indicating that they have completed the write operation (act 1260).

The primary replica may send the replies to client 110 (act 1270). The primary replica may report any errors encountered at any of the replicas to client 110. When errors occur, the write operation may have succeeded at an arbitrary subset of the replicas. In this case, the client write request is considered to have failed, and the modified region is left in an undefined state. Client 110 may handle such errors by retrying the failed write operation. The retry operation may attempt to repeat acts 1230 through 1270 before falling back to retry from the beginning of the write operation at act 1210.

Atomic Record Append Operation

The file system (FIG. 1) may permit multiple clients 110 to concurrently append to the same file during a record append operation. For a record append operation, a client 110 may specify only the data record to be written. The data record may then be appended atomically to the file, and the offset at which the record was written may be returned to client 110. The file can be used as a multiple-producer/ single-consumer queue, or can contain the merged results from different programs.

Figure 14:
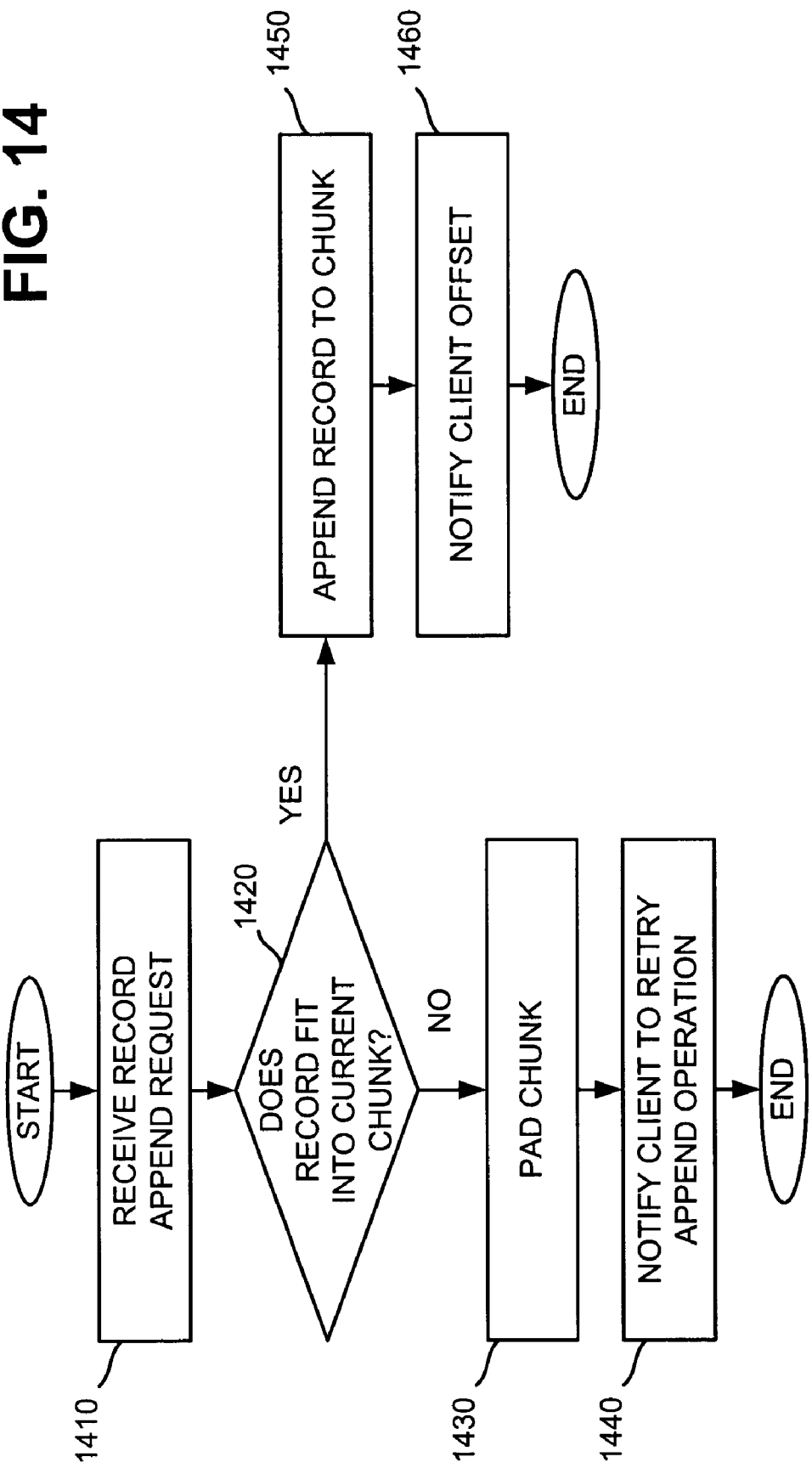
FIG. 14 is a flowchart of exemplary processing for performing a record append operation according to an implementation consistent with the principles of the invention.

FIG. 14 is a flowchart of exemplary processing for performing a record append operation according to an implementation consistent with the principles of the invention. When client 110 wants to perform a record append operation, client 110 may perform acts similar to acts 1210 through 1230, as described above with regard to FIG. 12. Once all of the replicas have acknowledged receiving the record to be appended, client 110 may send a record append request to the primary replica for the last chunk in the file.

The primary replica may receive the record append request and determine whether the record fits into the current chunk replica (acts 1410 and 1420). For example, the primary replica may determine whether appending the record to the current chunk would cause the chunk to exceed its maximum size (e.g., 64 MB). Append operations may be restricted to be at most one fourth of the maximum chunk size, so that they are more likely to fit into a chunk without too much fragmentation.

If appending the record would cause the current chunk to exceed its maximum size, the primary replica may pad the chunk to its maximum size using, for example, a special padding character (act 1430). The primary replica may instruct the other replicas to do the same. The primary replica may then notify client 110 to retry the append operation on the next chunk (act 1440).

If the record fits within the current chunk, the primary replica may append the record to the chunk (act 1450). The primary replica may also forward the append request to the secondary replicas and inform them of the offset at which it wrote the record so that the secondary replicas can write the data at exactly the same offset used by the primary replica, even if this requires over-writing some existing data. The primary replica may then notify client 110 of the assigned offset (act 1460).

If an append operation fails at any of the replicas, client 110 retries the operation. As a result of the failure, the individual replicas may contain different data possibly including multiple copies of the same record. Furthermore, partial contents of an append operation may also be written under some situations. There may be no guarantee that all replicas are bytewise identical. Instead, it may be guaranteed only that the data is written at least once as an atomic unit (i.e., in one contiguous file region). This property follows readily from the simple observation that for the operation to report success, the data must have been written at the same offset on all replicas of some chunk. Furthermore, after this, all replicas are at least as long as the end of a record and, therefore, any future record will be assigned a higher offset (or a different chunk) no matter which replica is the primary replica.

Partial writes and the padding bytes written spontaneously by chunk servers 120 do not cause a problem because checksums may be embedded within each piece of data written using record append. Therefore, partial writes can be easily ignored because of checksum mismatches. Multiple instances of the same record may be delivered to client 110, which can suppress them if it desires by embedding a unique identifier in each record.

With the above processing, the primary replica may simultaneously receive two or more record append requests for the same file. In this case, the primary replica may serialize the append requests. The particular order in which the append requests are serviced may be programmable. Also, the primary replica may concurrently process two or more record append operations. For example, the primary replica may receive a record associated with one append operation, while processing an append request associated with another append operation.

While the record append request and the record to be appended have been described as following different paths, this need not be the case. In another implementation, the record append request and the record to be appended may be sent via the same path or may be sent in a manner different from that described above.

Snapshot Operation

The file system (FIG. 1) may permit a snapshot operation to be performed. A snapshot operation makes a copy of a file or a directory tree almost instantaneously, while minimizing any interruptions of ongoing modifications. The snapshot operation may be used to quickly create branch copies of huge data sets (and often copies of those copies, recursively), or checkpoint the current state before experimenting with changes that can later be committed or rolled back easily.

Figure 15:
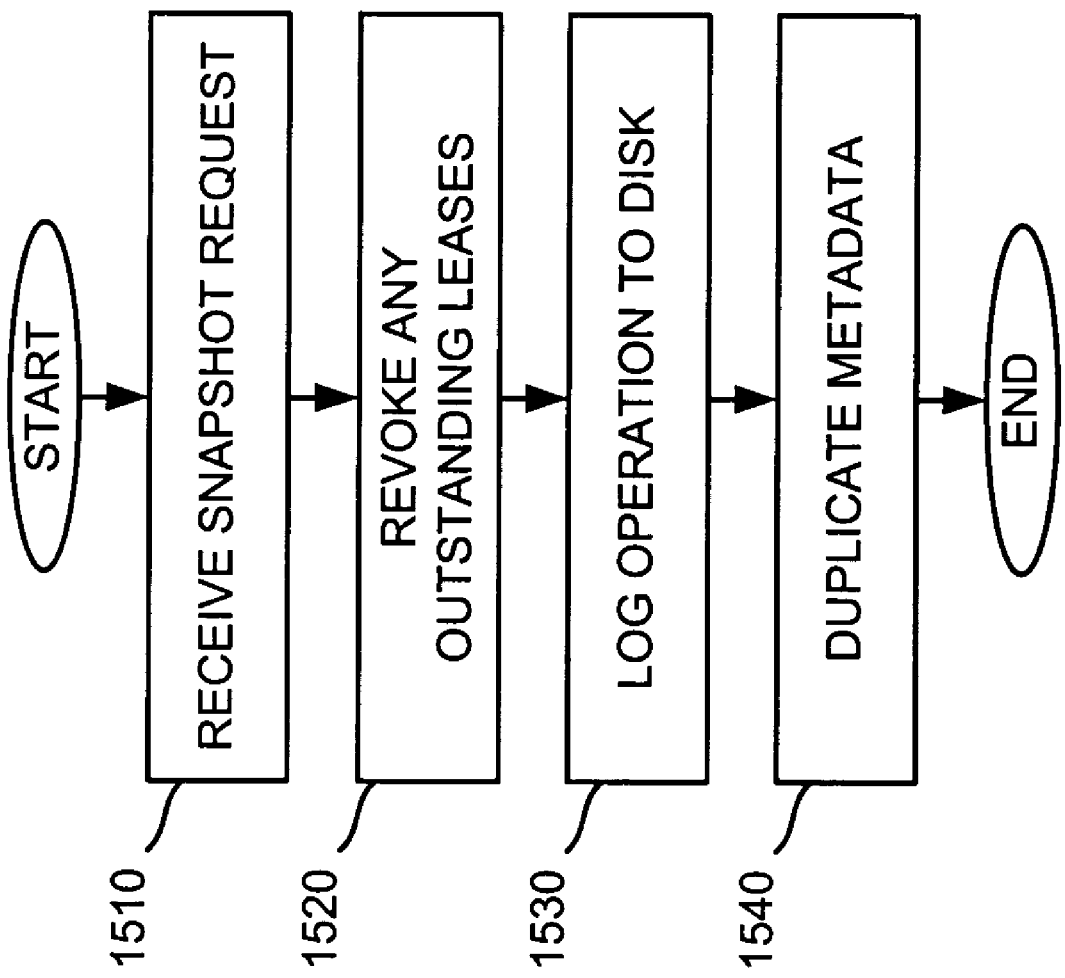
FIG. 15 is a flowchart of exemplary processing for performing a snapshot operation according to an implementation consistent with the principles of the invention.

FIG. 15 is a flowchart of exemplary processing for performing a snapshot operation according to an implementation consistent with the principles of the invention. When master 130 receives a snapshot request, master 130 may revoke any outstanding leases on the chunks in the files it is about to copy (acts 1510 and 1520). This may ensure that any subsequent writes to these chunks will require an interaction with master 130 to find the lease holder. This may give master 130 an opportunity to create a new copy of the chunk first. Most of the time taken by a snapshot operation may be spent waiting for chunk servers 120 to confirm the lease revocation or, at worst, for the lease granted to a now unreachable chunk server 120 to expire naturally.

After the leases have been revoked or have expired, master 130 may log the snapshot operation to disk (act 1530). Master 130 may apply this log to its in-memory state by duplicating the metadata for the source file or directory tree (act 1540). The newly created snapshot files point to the same chunks as the source files.

The first time a client 110 wants to write to a chunk "C" after the snapshot operation, it sends a request to master 130 to find the current lease holder. Master 130 may notice that the reference count for chunk C is greater than one. The reference count refers to the number of files that contain the chunk. For example, if the reference count is greater than one, then the chunk is included in more than one file and is, thus, a copy-on-write chunk. Master 130 may defer replying to the client request and instead select a new chunk handle C'. Master 130 may then ask each chunk server 120 that stores a current replica of chunk C to create a new chunk called C'. By creating the new chunk on the same chunk servers 120 as the original, the data can be copied locally instead of over a network, which may be much slower. Master 130 may then grant one of the replicas a lease on the new chunk C' and reply to client 110. Client 110 may then write the chunk normally, not knowing that it has just been created from an existing chunk.

Fault Tolerance

Component failures can result in an unavailable system or, worse, corrupted data. Systems and methods consistent with the principles of the invention provide fault tolerance features to address the possibility of component failures. The fault tolerance features may be classified into three categories: high availability, data integrity, and diagnostic tools.

High Availability

Among the hundreds or thousands of possible chunk servers 120, some are bound to be unavailable at any given time. The file system (FIG. 1) can be kept highly available via two features: fast recovery and replication.

To ensure fast recovery, both master 130 and chunk servers 120 may be designed to restore their state in seconds no matter how they terminated. For example, there may be no distinction between normal and abnormal termination.

As described earlier, each chunk may be replicated on multiple chunk servers 120 on different racks. As a user-configurable feature, different replication levels may be specified for different parts of the file namespace. Master 130 may clone existing replicas as needed to keep each chunk fully replicated as chunk servers 120 go offline or detect corrupted replicas through checksum verification. Other forms of redundancy may be used between chunk servers 120, such as parity or erasure codes.

The state of master 130 may also be replicated for reliability. For example, the operation log and checkpoints of master 130 may be replicated on multiple master devices. A modification to the state of master 130 may be considered committed only after its log record has been flushed to disk on all master replicas. For simplicity, one master 130 remains in charge of all modifications as well as background activities, such as garbage collection, that change the file system (FIG. 1) internally.

When master 130 fails, it can restart almost instantly. Alternatively or additionally, a monitoring infrastructure (not shown) may be put in place to monitor operation of master 130. When master 130 fails (or its disk fails), the monitoring infrastructure may start a new master using a master replica and its replicated log. Clients 110 need only know the canonical name of master 130, which is an alias that can be changed if master 130 is relocated to another master device.

There may also be multiple shadow masters. The shadow masters may be considered shadows, not mirrors, because they may lag master 130 slightly, typically fractions of a second. The shadow masters may provide read-only access to the file system even when master 130 is down. They may enhance read availability for files that are not being actively written or clients 110 that do not mind getting some stale results. Because file content is read from chunk servers 120, clients 110 may not observe stale file content. Metadata, such as directory contents or access control information, could be stale for short periods of time.

A shadow master may read a replica of a growing operation log and apply the same sequence of changes to its data structures as master 130 does. Like master 130, the shadow master may poll chunk servers 120 at startup (and infrequently thereafter) to locate chunk replicas. The shadow master may also exchange heartbeat messages with chunk servers 120 to monitor their status. The shadow master may depend on master 130 for replica location updates resulting from the decisions of master 130 to create and delete replicas.

Data Integrity

Because the file system (FIG. 1) may include thousands of disks on hundreds of chunk servers 120, the file system can regularly experience disk failures that cause data corruption. The file system can easily recover the data from other replicas, but it would be impractical to detect corruption by comparing replicas across chunk servers 120. Therefore, each chunk server 120 may independently check the integrity of its own data.

Chunk servers 120 may use checksumming to detect corruption of the chunk data that they store. A chunk may be broken up into a series of 64 KB blocks, each with a corresponding 32-bit checksum. The checksums may be stored persistently in memory, possibly separate from the chunk data.

For a read operation, a chunk server 120 may verify the checksum of data blocks that overlap the read range before returning any data to the requester (whether a client 110 or another chunk server 120). As a result, chunk servers 120 do not propagate data corruption to other devices (e.g., a client 110 or another chunk server 120). If a block does not match the recorded checksum, chunk server 120 may return an error to client 110 and report the mismatch to master 130. In response, client 110 may read from other replicas, while master 130 may clone the chunk from another replica. After a valid new replica is in place, master 130 may instruct chunk server 120 that reported the mismatch to delete its replica.

Client 110 may reduce this overhead by trying to align reads at checksum block boundaries. Moreover, checksum lookups and comparisons on chunk server 120 may be performed without any input or output operation and can often be overlapped with input and output operations.

Write operations that append to the end of a chunk (as opposed to write operations that overwrite an existing byte range) may be handled very efficiently. The checksum for the last partial checksum block may be incrementally updated and new checksums for any brand new checksum blocks filled by the write operation may be determined. If the last partial checksum block is already corrupt, the new checksum value will not match the stored data and the corruption may be detected as usual on the next read.

If a write operation overwrites an existing range of the chunk, however, the first and last blocks of the range being overwritten may be read and verified. The write operation may then be performed and the new checksums may be determined and logged. If the first and last blocks are not verified before overwriting them partially, the new checksums may hide corruption that exits in the regions not being overwritten.

During idle periods, chunk servers 120 may scan and verify the contents of inactive chunks. This facilitates the detection of corrupt chunks that are rarely read. Once the corruption is detected, master 130 can create a new uncorrupted replica and delete the corrupted replica. This prevents a situation where an inactive, but corrupt, chunk replica fools master 130 into believing that it has enough valid replicas of a chunk.

Diagnostic Tools

Extensive and detailed diagnostic logging may aid in problem isolation, debugging, and performance analysis, while incurring only a minimal cost. Without logs, it may be hard to understand transient, non-repeatable interactions between devices (e.g., clients 110 and/or chunk servers 120). Chunk servers 120 may generate diagnostic logs that record many significant events (e.g., chunk servers 120 going up and down), and all remote procedure call requests and replies. These diagnostic logs can be freely deleted without affecting the correctness of the file system (FIG. 1). These logs may be retained, however, as long as memory space permits.

The performance impact of logging is minimal (and far outweighed by the benefits) because these logs may be written sequentially and asynchronously. The most recent events may also be kept in memory and available for continuous on-line monitoring.

The remote procedure call logs may include the exact requests and responses exchanged between devices, except for the file data being read or written. By matching requests with replicas and collating remote procedure call records on different devices, the entire interaction history may be reconstructed to diagnose a problem. The logs may also serve as traces for load testing and performance analysis.

CONCLUSION

Systems and methods consistent with the principles of the invention may use a locking scheme over regions of the namespace to permit operations to execute concurrently without interfering with each other. Each operation may acquire a set of locks on portions of the namespace and is permitted to proceed when these locks do not conflict with locks acquired by other operations.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5–10, 12, 14, and 15, the order of the acts may be differ in other implementations consistent with the present invention. Moreover, non-dependent acts may be performed in parallel.

Also, various terms, such as "file," "chunk," "replica," and "record," have been used to refer to data stored by the file system. These terms are intended to refer to any type or form of data. Further, it has been described that the size of a chunk is 64 MB. In other implementations, the chunk size may be larger or smaller than 64 MB or may vary in size.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for performing operations within a file system in which directories and files are organized as nodes in a namespace tree, the method comprising:
   associating a read-write lock with each of the nodes in the namespace tree;
   acquiring a first lock on a name of one or more directories involved in a first operation;
   acquiring a second lock on an entire pathname involved in the first operation;
   determining whether the first lock or the second lock conflicts with third locks acquired by a second operation;
   performing the first operation when the first lock or the second lock does not conflict with the third locks, where the first, second, and third locks are read-write locks; and
   serializing performance of the first and second operations when the first lock or the second lock conflicts with the third locks, where serializing performance includes:
   determining an order for the first, second, and third locks based on levels of the namespace tree involved in the first, second, and third locks and within one of the levels of the namespace tree involved in the first, second, and third locks.

2. The method of claim 1, wherein the performing the first operation includes:
   concurrently performing the first operation and the second operation when neither the first lock nor the second lock conflicts with the third locks.

3. The method of claim 1, wherein the first lock is a read lock.

4. The method of claim 1, wherein the second lock is one of a read lock or a write lock.

5. The method of claim 1, wherein the first operation is a read operation, the first lock is a read lock, and the second lock is a read lock.

6. The method of claim 1, wherein the first operation is a namespace modification operation, the first lock is a read lock, and the second lock is a write lock.

7. The method of claim 1, wherein the first operation is a snapshot operation, the first lock is a read lock, and the second lock is a write lock.

8. The method of claim 1, wherein the determining whether the first lock or the second lock conflicts with third locks includes:
   using a lazily allocated data structure that maps pathnames to locks to determine whether the first lock or the second lock conflicts with the third locks.

9. The method of claim 1, wherein serializing performance of the first and second operations further includes:
   serializing the first, second, and third locks when the first lock or the second lock conflicts with the third locks.

10. The method of claim 1, further comprising:
    permitting the first and second operations to concurrently operate within a same one of the directories when neither the first lock nor the second lock conflicts with the third locks.

11. A system for performing operations within a file system, comprising:
    means for obtaining one or more first locks on one or more directory names involved in an operation;
    means for obtaining a second lock on an entire pathname involved in the operation;
    means for detecting whether the one or more first locks or the second lock conflict with one or more third locks acquired by another operation;
    means for executing the operation when the one or more first locks or the second lock do not conflict with the one or more third locks, the one or more first locks, the second lock, and the one or more third locks being read-write locks; and
    means for serializing execution of the operation and the other operation when at least one of the one or more first locks or the second lock conflicts with the one or more third locks, where the means for serializing execution includes:
    means for determining an order for the one or more first locks, the second lock, and the one or more third locks based on levels of a namespace tree involved in the one or more first locks, the second lock, and the one or more third locks and within one of the levels of the namespace tree involved in the one or more first locks, the second lock, and the one or more third locks.

12. A file system, comprising:
    a memory configured to store information regarding directories and files organized as nodes in a namespace tree; and a processor connected to the memory and configured to:
  associate a read-write lock with each of the nodes in the namespace tree,
  acquire one or more first locks on names of one or more of the directories involved in a first operation,
  acquire a second lock on an entire pathname involved in the first operation,
  determine whether the one or more first locks or the second lock conflict with one or more third locks acquired by a second operation,
  permit the first operation to execute when the one or more first locks or the second lock do not conflict with the one or more third locks, the one or more first locks, the second lock, and the one or more third locks being read-write locks, and
  serialize execution of the first and second operations when at least one of the one or more first locks or the second lock conflicts with the one or more third locks, when serializing execution of the first and second operations, the processor is configured to:
    determine an order for the one or more first locks, the second lock, and the one or more third locks based on levels of the namespace tree involved in the one or more first locks, the second lock, and the one or more third locks and within one of the levels of the namespace tree involved in the one or more first locks, the second lock, and the one or more third locks.

13. A method for performing first and second operations within a file system, comprising:
  acquiring one or more first locks on one or more first directory names involved in the first operation;
  acquiring one or more second locks on one or more second directory names involved in the second operation;
  acquiring a third lock on a first pathname involved in the first operation;
  acquiring a fourth lock on a second pathname involved in the second operation;
  determining whether the first and third locks conflict with the second and fourth locks;
  concurrently performing the first and second operations when the first and third locks do not conflict with the second and fourth locks, the one or more first locks, the one or more second locks, the third lock, and the fourth lock being read-write locks; and
  serializing performance of the first and second operations when the first lock or the third lock conflicts with the second lock or the fourth lock, where serializing performance of the first and second operations includes:
    determining an order for the first, second, third, and fourth locks based on levels of a namespace tree involved in the first, second, third, and fourth locks and within one of the levels of the namespace tree involved in the first, second, third, and fourth locks.

14. A method for performing first and second operations within a same directory, comprising:
  obtaining a first lock on a sub-directory or file name within the directory by the first operation;
  obtaining a second lock on a sub-directory or file name within the directory by the second operation;
  determining whether the first and second locks conflict;
  concurrently performing the first and second operations when the first and second locks do not conflict, the first and second locks being read-write locks; and
  serializing performance of the first and second operations when the first and second locks conflict, where serializing performance of the first and second operations includes:
    determining an order for the first and second locks based on levels of a namespace tree involved in the first and second locks and within one of the levels of the namespace tree involved in the first and second locks.

15. A file system, comprising:
a memory configured to store information regarding a plurality of directories and files as nodes in a namespace tree; and
a processor connected to the memory and configured to:
  associate a read-write lock with each of the nodes in the namespace tree,
  identify a set of the nodes involved in an operation, the identified nodes forming a pathname associated with the operation,
  acquire a first one or more read-write locks, as one or more first locks, on the identified nodes,
  acquire a second one of the read-write locks, as a second lock, on the pathname,
  determine whether the one or more first locks or the second lock conflict with a read-write lock acquired by another operation,
  permit the operation to execute when the one or more first locks and the second lock do not conflict with the read-write lock, and
  serially execute the operation and the other operation when at least one of the one or more first locks or the second lock conflicts with the read-write lock acquired by the other operation, when serially executing the operation and the other operation, the processor is configured to:
    determine an order for the one or more first locks, the second lock, and the read-write lock based on levels of the namespace tree involved in the one or more first locks, the second lock, and the read-write lock and within one of the levels of the namespace tree involved in the one or more first locks, the second lock, and the read-write lock.

* * * * *